(12) United States Patent
Harrel et al.

(10) Patent No.: US 10,941,902 B2
(45) Date of Patent: Mar. 9, 2021

(54) VALVE GREASE BLOCKS FOR HIGH PRESSURE VALVES AND HIGH PRESSURE VALVES USING THE SAME

(71) Applicant: Quarter Turn Pressure Control, LLC, Midland, TX (US)

(72) Inventors: Travis Harrel, Midland, TX (US); Christian Leuchtenberg, Singapore (SG)

(73) Assignee: QUARTER TURN PRESSURE CONTROL, LLC, Midland, TX (US)

( * ) Notice: Subject to any disclaimer, the term of this patent is extended or adjusted under 35 U.S.C. 154(b) by 126 days.

(21) Appl. No.: 16/031,940

(22) Filed: Jul. 10, 2018

(65) Prior Publication Data

US 2020/0018439 A1    Jan. 16, 2020

(51) Int. Cl.
| | | |
|---|---|---|
| F16N 21/00 | (2006.01) | |
| F16N 17/00 | (2006.01) | |
| F16K 3/36 | (2006.01) | |
| F16N 23/00 | (2006.01) | |
| E21B 43/26 | (2006.01) | |

(52) U.S. Cl.
CPC .............. *F16N 21/00* (2013.01); *F16K 3/36* (2013.01); *F16N 17/00* (2013.01); *F16N 23/00* (2013.01); *E21B 43/26* (2013.01)

(58) Field of Classification Search
CPC ... F16K 3/36; F16K 5/22; F16K 5/222; F16K 5/225; F16K 5/227; F16K 11/04; E21B 43/26; F16N 21/00; F16N 17/00; F16N 23/00; F16N 25/02; Y10T 137/4238

USPC .......................................................... 251/355
See application file for complete search history.

(56) References Cited

U.S. PATENT DOCUMENTS

| | | | | |
|---|---|---|---|---|
| 837,644 | A * | 12/1906 | Reilly ..................... | F16K 5/222 137/246.13 |
| 1,872,211 | A * | 8/1932 | Yarnall .................... | F16K 3/262 137/246.16 |
| 1,961,051 | A * | 5/1934 | Kerns ..................... | F16N 27/00 184/7.2 |
| 2,007,169 | A * | 7/1935 | Kerns .................... | F16N 27/005 184/7.3 |
| 2,077,191 | A * | 4/1937 | Staley ..................... | F16K 27/02 184/55.1 |
| 2,468,674 | A * | 4/1949 | Leonard ................ | F16K 11/083 251/188 |
| 2,813,695 | A | 11/1957 | Stogner | |
| 2,911,187 | A | 11/1959 | Owsley | |

(Continued)

FOREIGN PATENT DOCUMENTS

| | | |
|---|---|---|
| CN | 202418669 U | 9/2012 |
| CN | 203548966 U | 4/2014 |

(Continued)

*Primary Examiner* — David Colon-Morales

(57) ABSTRACT

A high-pressure grease block including a grease block body having a grease block cavity defined therein and adapted to cooperate with a valve body. A first port is adapted for sealing connection to a port on the valve body such that a valve grease cavity defined within the valve body communicates with the grease block cavity. A second port communicates with the grease block cavity and is adapted for receiving a greasing assembly and a third port communicates with the grease block cavity and is adapted for receiving a bleeding assembly.

15 Claims, 12 Drawing Sheets

(56) References Cited

U.S. PATENT DOCUMENTS

| | | | | |
|---|---|---|---|---|
| 2,963,262 A | * | 12/1960 | Shafer | F16K 5/0673 |
| | | | | 251/172 |
| 2,988,319 A | * | 6/1961 | Erwin | F16K 5/162 |
| | | | | 251/163 |
| 3,006,357 A | * | 10/1961 | Woerner | F16K 3/36 |
| | | | | 137/237 |
| 3,061,267 A | | 10/1962 | Hamer | |
| 3,133,722 A | | 5/1964 | Mcguire | |
| 3,180,351 A | * | 4/1965 | Wolfensperger | F16K 5/227 |
| | | | | 137/246.18 |
| 3,301,523 A | | 1/1967 | Lowrey | |
| 3,346,002 A | | 10/1967 | Thompson, Jr. | |
| 3,384,337 A | * | 5/1968 | Brown | F16K 5/201 |
| | | | | 251/172 |
| 3,392,743 A | * | 7/1968 | Pennington | F16K 5/227 |
| | | | | 137/246.22 |
| 3,416,558 A | * | 12/1968 | Works | F16K 5/0673 |
| | | | | 137/246.22 |
| 3,423,067 A | | 1/1969 | Foster | |
| 3,424,190 A | * | 1/1969 | Wolfensperger | F16K 5/227 |
| | | | | 137/246.15 |
| 3,478,403 A | * | 11/1969 | Wolfensperger | F16K 5/20 |
| | | | | 29/890.132 |
| 3,497,177 A | | 2/1970 | Hulsey | |
| 3,542,054 A | * | 11/1970 | Works | F16K 5/227 |
| | | | | 137/246.22 |
| 3,584,641 A | * | 6/1971 | Milleville | F16K 5/0673 |
| | | | | 137/246.15 |
| 3,916,940 A | * | 11/1975 | Allen | F16K 5/227 |
| | | | | 137/340 |
| 3,958,592 A | * | 5/1976 | Wells | F16K 3/0254 |
| | | | | 137/315.3 |
| 4,113,228 A | | 9/1978 | Frye | |
| 4,338,981 A | * | 7/1982 | Frauenberger | F16K 3/36 |
| | | | | 137/237 |
| 4,340,204 A | * | 7/1982 | Herd | F16K 3/36 |
| | | | | 251/214 |
| 4,512,441 A | * | 4/1985 | Cooper | F16N 5/02 |
| | | | | 137/539 |
| 4,869,463 A | * | 9/1989 | Niittyla | F16N 21/00 |
| | | | | 251/149.6 |
| 5,598,902 A | * | 2/1997 | Lin | F16N 11/04 |
| | | | | 137/454.5 |
| 6,279,875 B1 | | 8/2001 | Chatufale | |
| 6,554,249 B2 | | 4/2003 | Pang et al. | |
| 6,561,480 B1 | * | 5/2003 | Komiya | F16K 1/50 |
| | | | | 251/129.12 |
| 6,619,431 B2 | * | 9/2003 | Wilcox | F16C 33/6625 |
| | | | | 184/105.3 |
| 6,664,572 B2 | | 12/2003 | Chatufale | |
| 6,966,537 B2 | | 11/2005 | Sundararajan | |
| 7,004,452 B2 | | 2/2006 | Chatufale | |
| 7,204,474 B2 | | 4/2007 | McGuire et al. | |
| 7,481,239 B2 | | 1/2009 | McGuire et al. | |
| 7,946,558 B2 | | 5/2011 | McGuire et al. | |
| 8,297,592 B2 | | 10/2012 | McGuire et al. | |
| 8,662,473 B2 | | 3/2014 | Comeaux | |
| 8,672,295 B2 | | 3/2014 | Dhawan et al. | |
| 8,689,886 B2 | | 4/2014 | Wolfe et al. | |
| 9,052,061 B2 | * | 6/2015 | He | F16N 3/10 |
| 9,206,915 B2 | * | 12/2015 | Croci | F16K 5/06 |
| 9,249,888 B2 | | 2/2016 | McEvoy et al. | |
| 9,261,196 B2 | | 2/2016 | McEvoy et al. | |
| 9,447,659 B2 | * | 9/2016 | Thistle | B08B 9/00 |
| 9,987,223 B2 | | 6/2018 | Ni | |
| 10,100,978 B2 | | 10/2018 | Gouge | |
| 2012/0080634 A1 | | 4/2012 | Fenton | |
| 2015/0345272 A1 | | 12/2015 | Kajaria et al. | |
| 2016/0201811 A1 | | 7/2016 | Hunter et al. | |
| 2016/0356399 A1 | | 12/2016 | Shu | |
| 2017/0130577 A1 | * | 5/2017 | Cheng | E21B 34/02 |
| 2017/0146189 A1 | | 5/2017 | Herman et al. | |
| 2017/0191570 A1 | | 7/2017 | Roberts | |
| 2017/0241552 A1 | | 8/2017 | Roberts | |
| 2017/0276293 A1 | | 9/2017 | McKim | |
| 2017/0336022 A1 | | 11/2017 | Gouge | |
| 2017/0343108 A1 | | 11/2017 | Hoang | |
| 2018/0010697 A1 | | 1/2018 | Parks, Jr. | |

FOREIGN PATENT DOCUMENTS

| | | |
|---|---|---|
| CN | 203979454 U | 12/2014 |
| CN | 204403416 U | 6/2015 |
| CN | 206280518 U | 6/2017 |
| WO | 2017136841 A1 | 8/2017 |

* cited by examiner

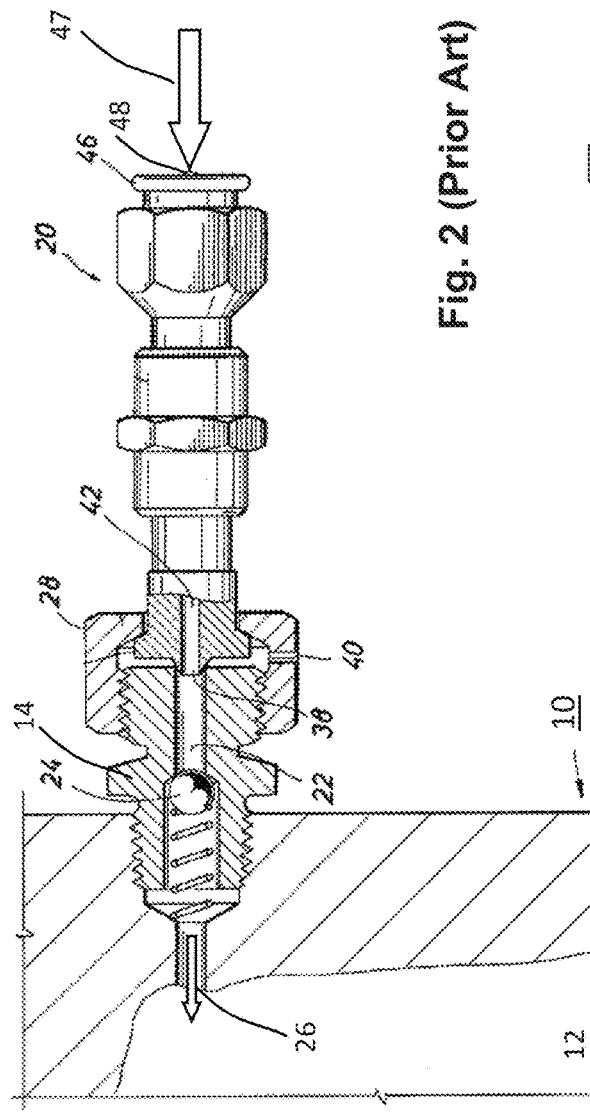
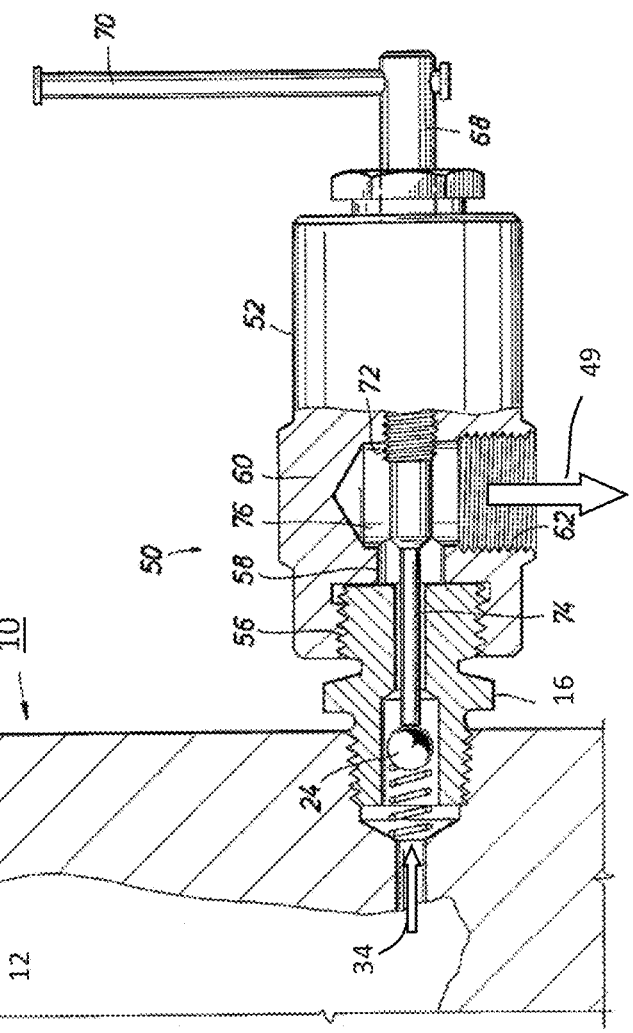
Fig. 2 (Prior Art)

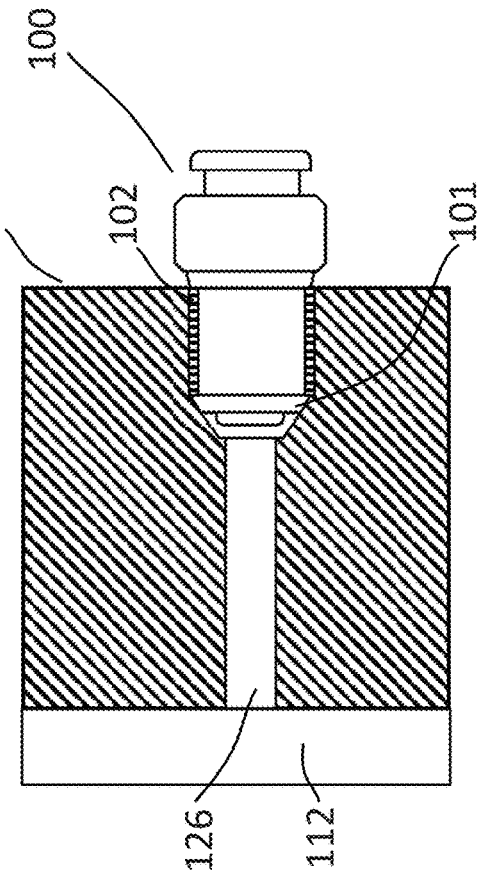
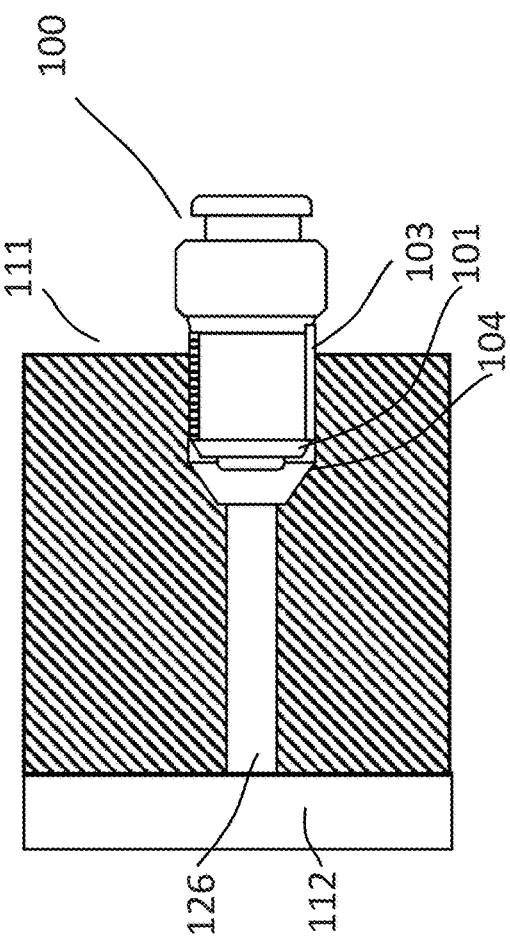
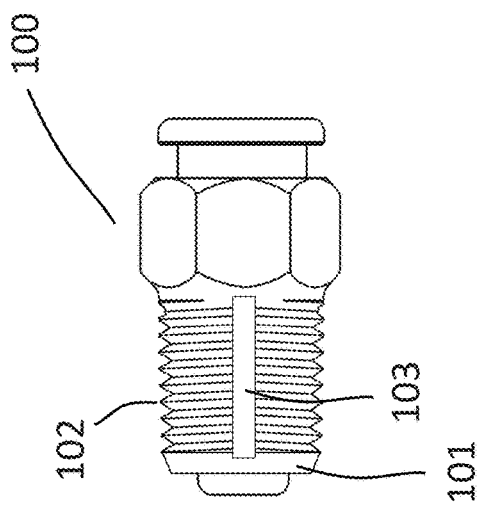

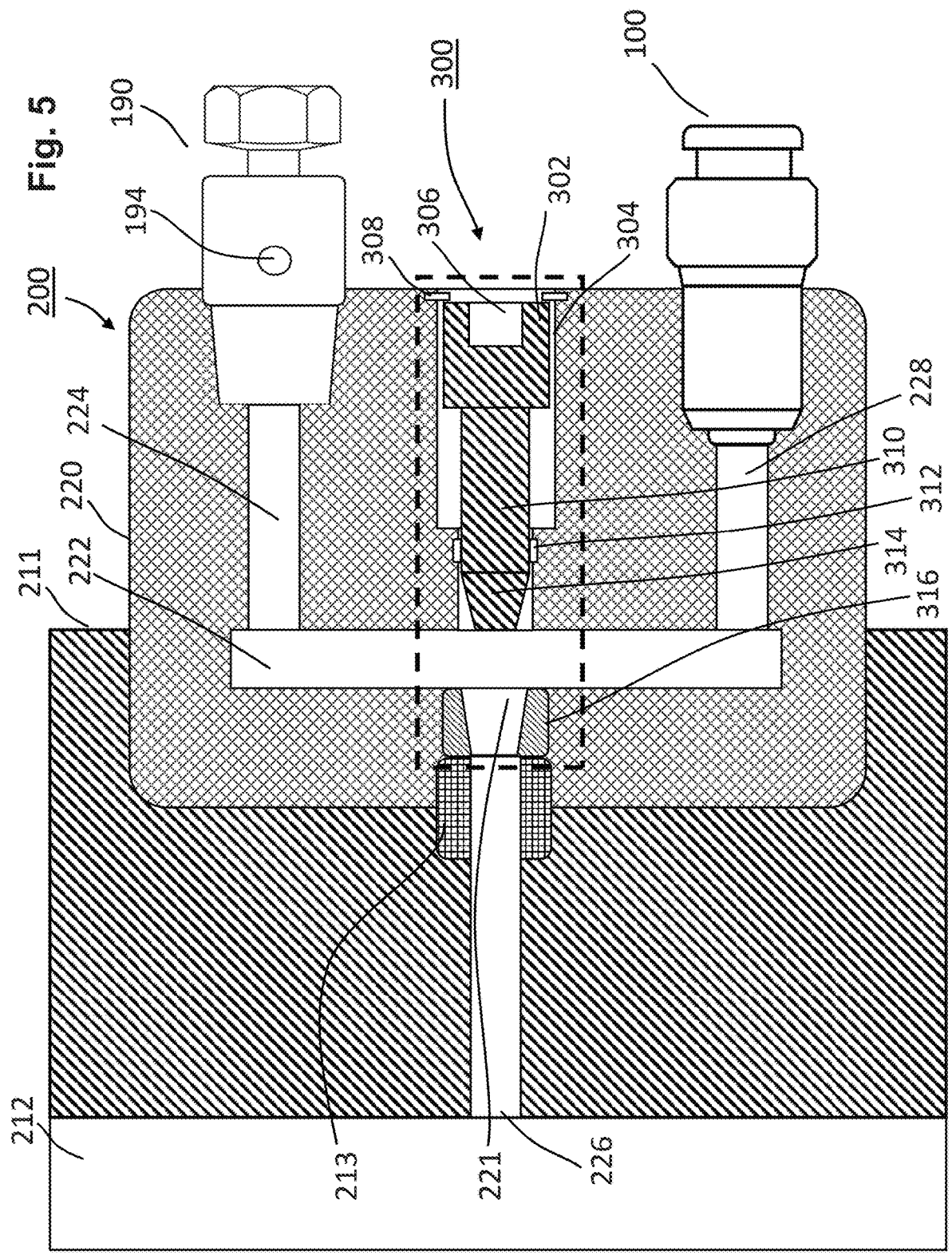

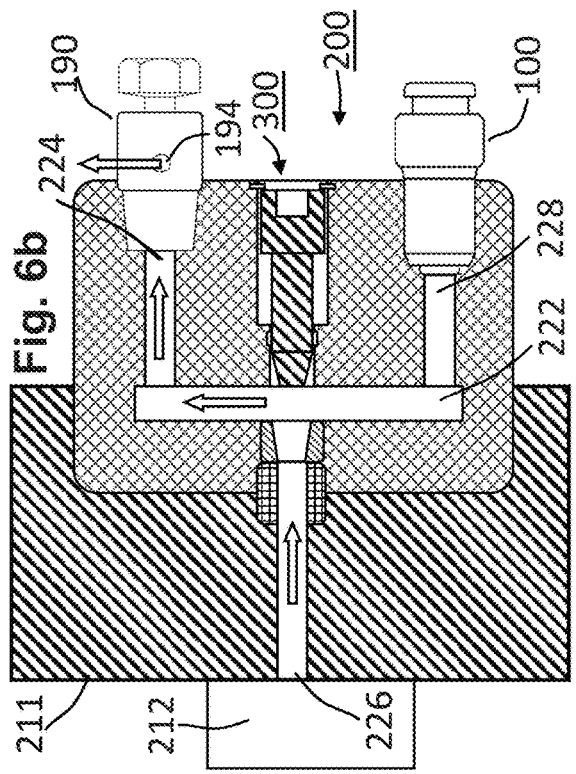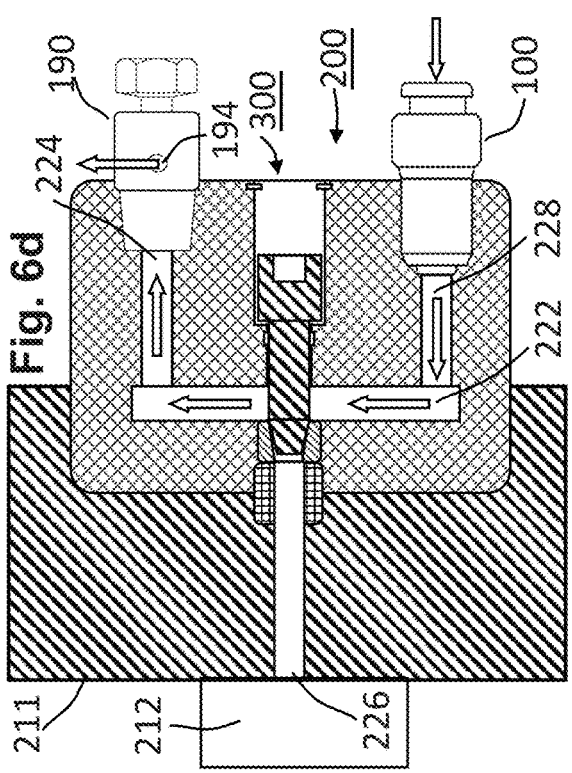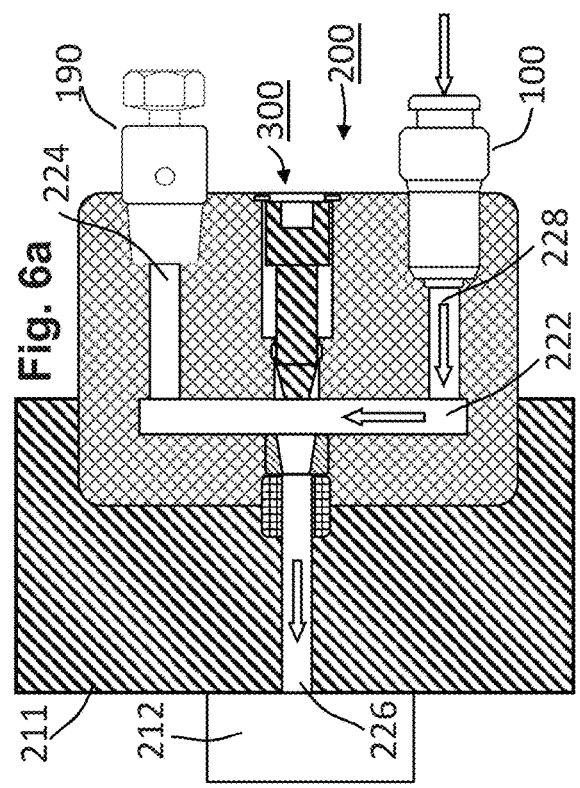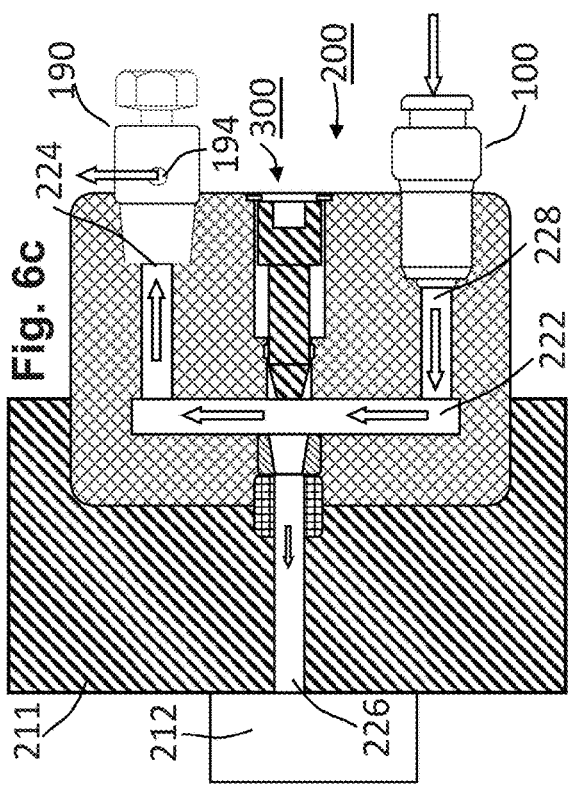

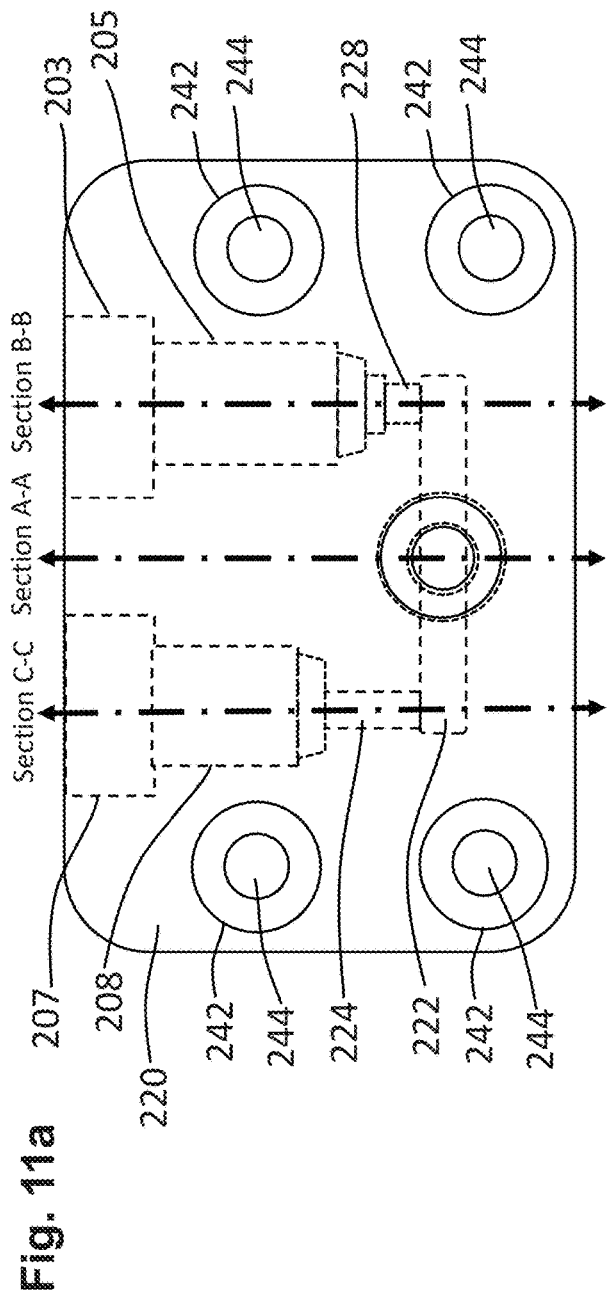
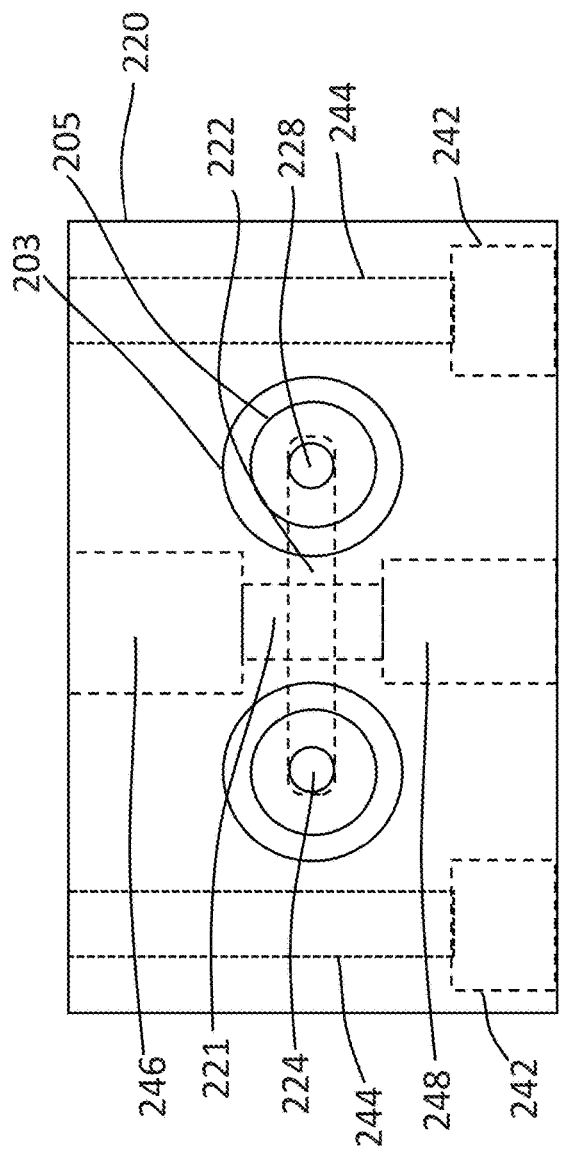

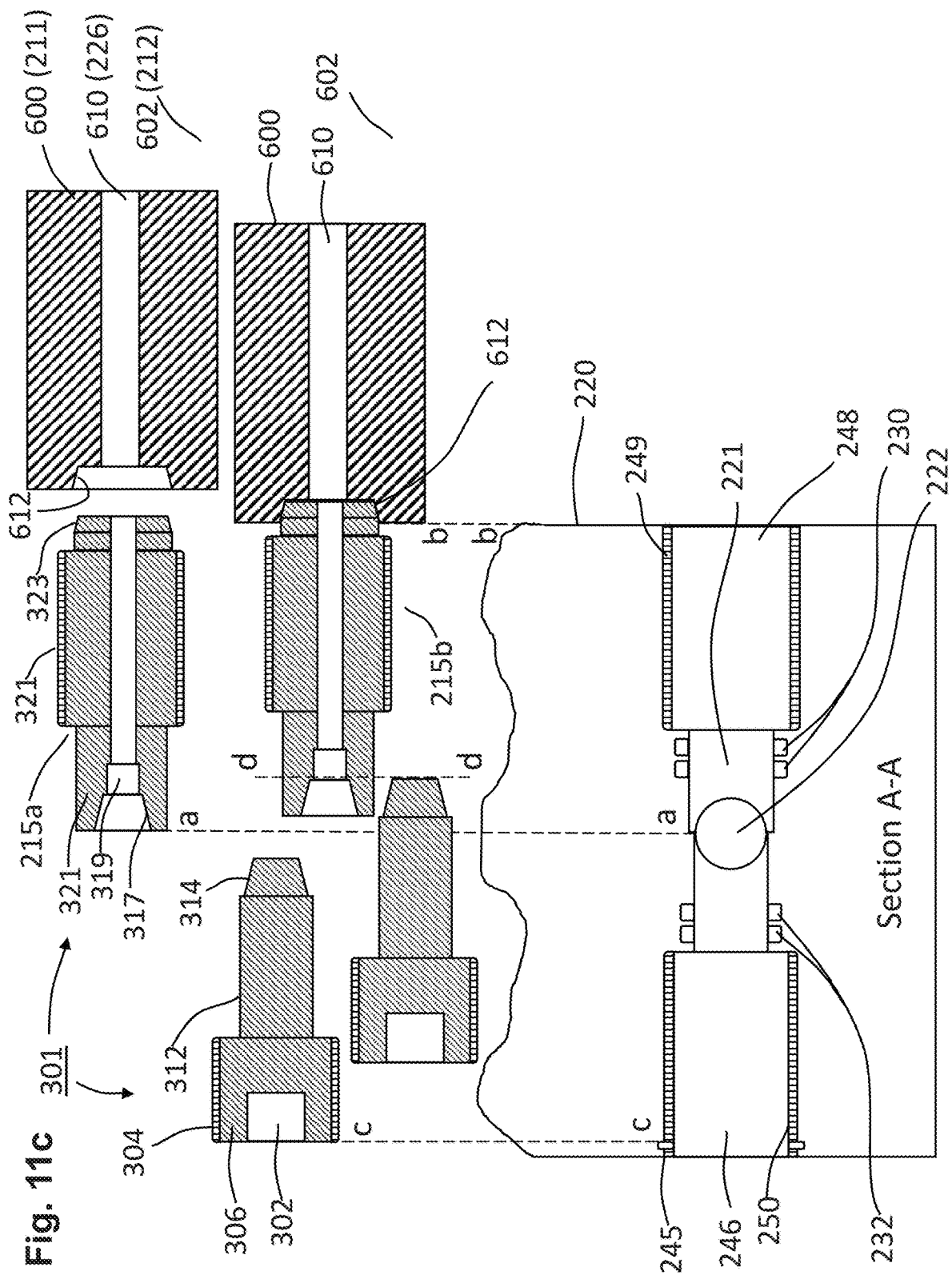

VALVE GREASE BLOCKS FOR HIGH PRESSURE VALVES AND HIGH PRESSURE VALVES USING THE SAME

FIELD OF INVENTION

The present invention relates in general to fluid drilling equipment and in particular to grease and bleed fittings used in high pressure valves subjected to severe operating conditions, such as the high pressures, high flow rates, and abrasive fluids commonly found in hydraulic fracturing operations and other oil and gas drilling applications.

BACKGROUND OF INVENTION

Grease and bleed fittings are an inherent feature of valves, especially in severe service conditions, such as high pressure, high temperature or abrasive flows. For example, grease may be used as body cavity filler to prevent unwanted accumulation of fluids or solids being passed through the valve. Some valves require high viscosity grease that acts more as a sealant for the metal sealing surfaces. These greases may have additives, such as Teflon fibers or other materials that assist in achieving a seal. Generally, the greases are injected through a grease fitting under pressure from a greasing unit that is attached to the grease fitting with a hose and an adapter. These grease fittings typically have one or more check valves to allow removal of the grease adapter without leaking the pressurized grease from the valve cavity. Sometimes the valve becomes grease locked after greasing meaning that the grease has filled all the cavities, sealed all the sealing areas and built up pressure that cannot self-release as the purpose of sealing the sealing areas was successful. In these instances, a bleed valve, commonly known as a bleeder fitting, is required. Grease fittings can be misused as a bleed valve by insertion of rods or similar solutions to force the check valve or valves to open.

In one of the most severe service applications known today, hydraulic fracturing ("fracing"), very hig pressure slurry is pumped through these valves at very high rates. In fracing, fracing slurry is forced down a wellbore with enough pressure to fracture the hydrocarbon bearing rock formations and force particulates into the resulting cracks. When the pressure is released, the particles ("proppant"), which may be sand or other high compressive strength additives such as ceramic particles and bauxite, remain in the factures (cracks) and keep the fractures open. This "mechanism" then allows pathways for hydrocarbon to flow from the rock that was previously solid. The particle size distribution in these facing fluids is distributed so that the larger particles can prop open larger cracks and finer particles can prop open the very tips of the cracks, which are microscopic in nature. The particle sizes can vary from 0.004 inches to 0.01 inches (No 140 Mesh to No 8 Mesh). The pumping pressure at the valve can be up to 15,000 psi and the slurry velocity through a valve bore of 5.125 inches, as is typical of a 5⅛ inch, 15000 psi valve, is well above erosional velocity of about 50 to 70 feet per second. Moreover, the fracing is typically preceded and followed by an acid wash of 15% hydrochloric acid, which accelerates corrosion.

As one skilled in the art of mechanical engineering can ascertain, the fracing "mechanism" will inject proppant particles into any crack, orifice or possible leak path in the valve assembly. The injected particles remain in the valve assembly when the pressure is released. Small particles as large as 0.004 inches are within machining tolerances of steel parts and therefore will find their way into metal sealing surfaces. With the high velocity of abrasive fracing fluid, any weakness or point of turbulence can very quickly lead to a washout of a seal area or any interface. If an area or interface adjoins the valve main body, then the life of the main valve body is severely limited.

To preserve the main moving sealing parts and to allow them to seal effectively very high viscosity sealing greases are injected and valves are greased as many times as practicable on a job, for both gate and plug valves, to force the proppant out of these interfaces. Greasing forces the proppant out of the interfaces to allow effective sealing and prevent scouring of the seal surfaces with trapped particles. Even with this procedure, the moving sealing faces have a very limited service life and are replaced frequently, to ensure effective sealing and to prevent scouring of the seal surfaces with trapped particles.

This greasing process is well described in prior art U.S. Pat. No. 4,338,981 by Frauenberger, which discloses the use of two grease fittings for flowing grease through a valve to completely fill a cavity. One of the grease fittings is locked open with a tool to allow grease to exit, i.e. to bleed from the cavity, thus enabling verification of complete fill of the cavity.

For modern gate and plug valves used in fracing operations this procedure has remained unchanged. The valves usually have at least two or more grease ports with grease fittings installed and grease is systematically injected between fracing stages when there is a lull in activity and less pressure on the valves. The procedure involves pushing in clean grease through one grease port and bleeding grease through another grease port. One purpose may be cavity displacement, which is usually full at the beginning, for displacing grease contaminated with sand out of the cavity. The other purpose may be to force such frac sand contaminated grease out of the sealing areas ideally into the bore of the valve by repeated actuation and greasing. Sometimes grease locking occurs as mentioned earlier and pressure has to be bled off from a grease fitting. Usually these valves do not have a dedicated grease bleed, as bleeding may need to occur at any of the same places as where the grease fittings are installed. The exact procedure varies from operator to operator and also changes based on the valve type, gate or plug, and exact design of such valves. Greasing is a major operation, as can be seen from several patent applications, which try to set up greasing manifolds and systems to simultaneously service many valves (e.g., US application US2017/0146189A1 assigned to General Electric).

The arduous greasing process has one Achilles heel, which is the grease fitting itself. For example, U.S. Pat. No. 4,512,441 by Cooper, explains the problem of grease debris blocking the check valve in a grease fitting. The practice of inserting a pin to force open the check valves can scratch the balls or seats of the check valve, which are the most commonly used type of grease check valve in fittings for high pressure applications. The damaged balls or seats lead to leaks under very high pressures. Sometimes when the pressure lock pressure has been bled off, the high viscosity of the sealing type grease can prevent the ball check from reseating, leading to weeping leaks. Worst of all it is possible when displacing the valve cavity or when bleeding pressure to have grease or sealant contaminated with frac sand enter the check valves of the grease fitting causing failure. Dedicated bleed valves do not solve the problem as they too can fail with frac sand contaminated grease.

The problem is well known and one grease fitting manufacturer has introduced a slot on the thread of a grease fitting. The slot is designed to bleed pressure and grease by backing off (unthreading), the grease fitting. This breaks (i.e. opens) the metal to metal seal interface, commonly used on these high pressure grease fittings between the fitting and the valve body. Then grease can flow out from the valve body through the slot along the tread, bypassing the sensitive check valve(s) of the grease fitting. Such a practice, as known by those skilled in the art, is inherently dangerous, given that a connection is being broken under pressure. In addition, this technique also affects the known pressure integrity of the valve, since a pressure tested connection has been broken. Furthermore, if sand contaminated grease should flow out, then the chances of successfully re-creating a valid metal to metal seal when screwing the grease fitting back in is substantially diminished.

There is a need to overcome these deficiencies. The core of the problem is having a single fluid conduit for the grease or bleed operation. Once the integrity of the fitting on this single conduit is compromised, then the barrier between the process fluid and the external environment is also compromised, an unacceptable situation for a high-pressure operation in the 21$^{st}$ century. Adding dedicated bleed ports does not solve the issue, as failure of the bleed fitting can lead to the same problem. In theory, adding an isolation valve between the valve body and the grease fitting will increase valve integrity, but this also leads to a significant protrusion from the valve body. This is a dangerous proposition on a high maintenance operation such as a fracing job. It also does not address the inherent root cause of the failure, which is frac sand contaminated grease inside an isolation device, whether this is a grease fitting, bleed fitting or a valve added between any of these fittings and the main valve body.

SUMMARY OF INVENTION

A multi-conduit fitting, termed a valve grease block, is disclosed for combined greasing and bleeding operations that is connected to a valve in the same position as a planned or existing grease/bleed fitting. This valve grease block is presented as a singular metallic block having a main orifice in communication with a valve cavity or grease/sealant injection point on the valve being greased. The preferred valve grease block has the capability of supporting two or more grease/bleed fittings incorporated with similar or less protrusion compared to the usual siting of such grease/bleed fittings on the valve body. These fittings may be attached as units to the valve grease block or they may be integrated within it. The internal configuration of the valve grease block allows flushing of all critical seal areas contained within the valve grease block with clean grease, and allows shut off of the main grease port to the valve for replacement or maintenance of the attached or integral greasing or bleeding fitments.

The principles of the present invention realize a significant improvement over the prior art, by allowing for all the required stages of greasing a valve (e.g., injecting grease, bleeding pressure, and bleeding contaminated grease) to be performed without breaking the main seal to the valve body at any stage. Embodiments of these principles advantageously eliminate the flow back of grease through the main grease injection fitting by providing a dedicated bleeding system with flushing capability.

Particular embodiments of the present invention include a valve grease block, which has a low profile for minimizing the mechanical handling risk profile during operations, as compared to prior art. Among other things, this valve grease block allows for the flushing of critical sealing areas with clean grease, so as to prevent the aforementioned core failure mechanism. In addition, embodiments of the valve grease block allow isolation of the main bore connection into the valve, such that it is possible to maintain components of the grease block during operations, if so required. The disclosed valve grease block can advantageously be incorporated into newly designed valves or retrofitted to existing valves. The principles of the present invention also has a major safety application for master valves on wellheads, where failure of the grease fitting on the valve side closest to the wellbore is a critical failure requiring a costly workover to temporarily plug the wellbore.

BRIEF DESCRIPTION OF DRAWINGS

For a more complete understanding of the present invention, and the advantages thereof, reference is now made to the following descriptions taken in conjunction with the accompanying drawings, in which:

FIG. 1a is a schematic cross-sectional view of a prior art valve assembly with grease fittings;

FIG. 1b is schematic side view showing in further detail the prior art grease fitting of FIG. 1a;

FIG. 2 is a schematic side view of a prior art greasing apparatus;

FIG. 3b is a schematic cross-sectional view of a commercially available adapter for the grease fitting shown in FIG. 3a;

FIG. 4a is a detailed view of a newer commercially available high pressure grease fitting;

FIG. 4b is a schematic cross-sectional view of a common current configuration of the high pressure grease fitting shown in FIG. 4a;

FIG. 4c details the method of use of the high pressure grease valve of FIG. 4a on high pressure frac valves;

FIG. 5 is a schematic block cross-sectional view of a high pressure grease block embodying the principles of the present invention;

FIGS. 6a-6d are schematic block cross-sectional views illustrating method of using a high pressure grease block according to the principles of the present invention;

FIG. 9b is a cross-sectional of the grease fitting port with respect to the plug valve cavity of FIG. 9a;

FIG. 11a is a face view of a detailed design of an embodiment of the invention;

FIG. 11b is a plan view of the embodiment of FIG. 11a;

FIG. 11c is a cross-sectional of the main port with isolation valve and seal to valve body assembly of the embodiment of FIG. 11a;

FIG. 11d is a cross-sectional view of the grease fitting installation of the embodiment of FIG. 11a; and FIG. 11e is a cross-sectional of a new design bleed fitting of the embodiment of FIG. 11a.

DETAILED DESCRIPTION OF THE INVENTION

Figure 1:
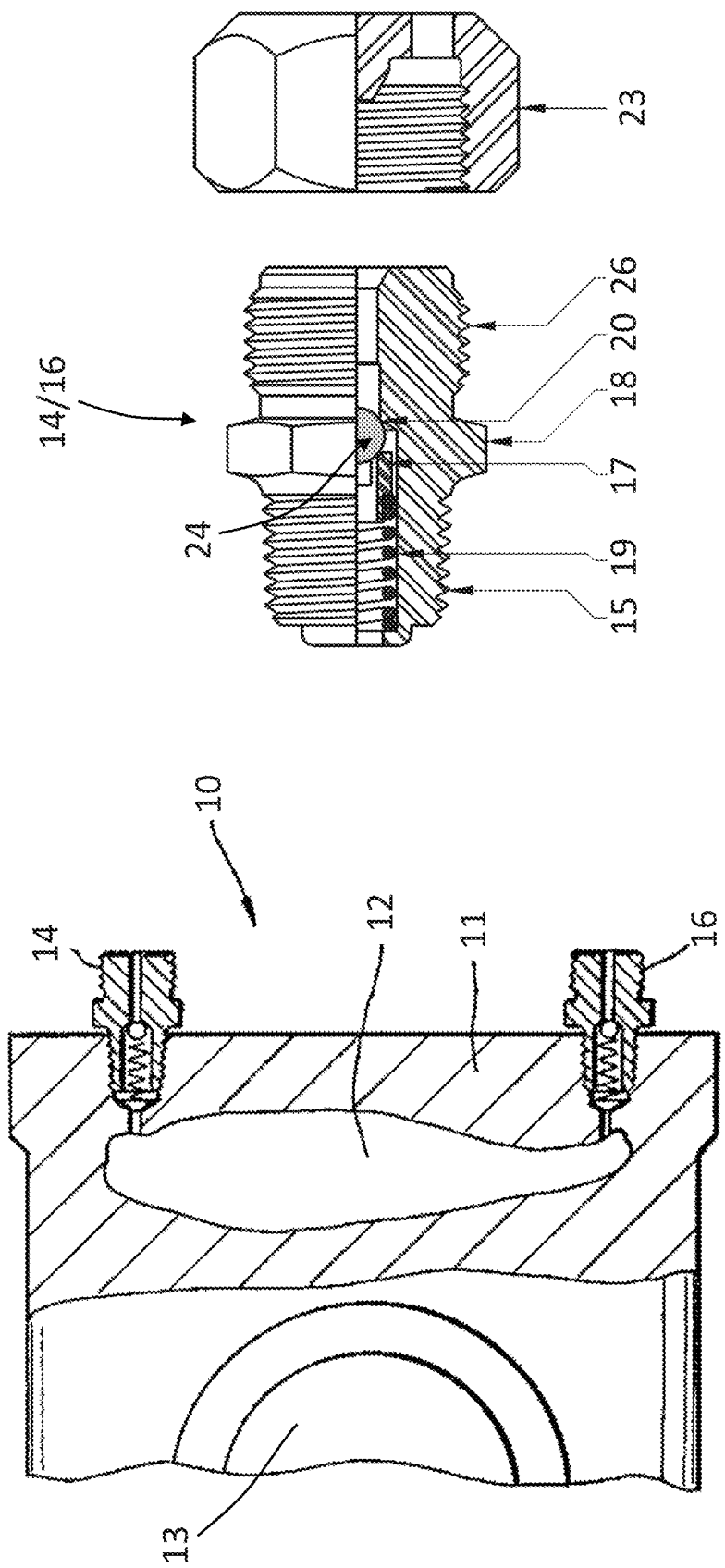

The problems being solved and the solutions provided by the embodiments of the principles of the present invention are best understood by referring to FIGS. 1 to 11 of the drawings, in which like numbers designate like parts.

FIG. 1a shows a schematic cross-sectional view of a prior art valve assembly 10 with two identical grease fittings 14 and 16 installed. The valve internals are schematically indicated by 13, along with the valve body 11 with a valve cavity 12. This is a very common arrangement, which allows for injection of grease into the valve cavity 12 from different points through grease fittings 14 and 16.

FIG. 1b is schematic side view showing the detail of a currently commercially available prior art grease fitting suitable for use as grease fittings 14 and 16 of FIG. 1a. This fundamental design has not changed significantly over the years and includes a thread 15 for installation into the valve body 11. A hexagonal profile 18 is provided to allow installation by a spanner. Internally, the grease fitting is a one way check valve allowing grease flow into the valve body, but no reverse flow. This is achieved by a spring 19 acting on a ball 24 through a retainer 17, which forces the ball 24 onto a seat 20. A cap 23 is threaded onto thread 26 to protect the grease fitting when not being used to inject grease. This simple type of singular check valve grease fitting can fail by contamination or damage between the seat 20 and the ball 24.

FIG. 2 is a schematic side view of a prior art greasing apparatus, which includes an inlet (fill) fitting 20. The inlet (fill) fitting 20 cooperates with the grease fitting 14, which has an internal passage 22. The passage 22 opens to the interior of the valve 10 and extends to the interior cavity 12 past the ball check valve 24. The inlet (fill) fitting 20, is joined to grease fitting 14 by an external coupling 28. A nipple 38 with a passage 42 is axially centered to penetrate the passage 22 slightly. The coupling 28 pulls the nipple 38 firmly against the passage 22 so that a leak proof connection is achieved. Additionally, a weep port 40 is formed in the coupling to the exterior. The inlet fitting 20 also includes the components of a check valve (not shown), which permits flow from the right to left as shown in FIG. 2, but prevents flow from left to right.

A peripheral lip 46, commonly known as a button head, enables connection with a grease gun hose or the like to inject a suitable grease. There is, therefore, a passage extending from a check valve ball 48 through the fitting 20 and communicating with the passage 42 through the ball check valve 24 to passage 26. The inlet (fill) fitting 20 thus enables filling of the cavity 12 with a selected grease 47 under pressure from some source (not shown).

A drain fitting 50 is attached to the grease fitting 16, which preferably is identical to grease fitting 14, although no egress exists for the chamber 12 to allow bleeding of grease or pressure. The drain fitting 50 includes an elongate cylindrical body 52, which terminates at one end at an internal passage, and includes a set of threads 56. A hollow body 60 further includes an axial passage 58 and serially connects with the end passage having the threads 56. The passage 58 is laterally intercepted by a drilled hole 76 and is internally threaded at 62. The threads 62 provide a recessed tapped drain opening, which can be used to attach a fitting or tube to direct the drain.

The cylindrical body 52 is further constructed with the passage 58 extending to the right hand end, where a shaft 68 is threaded at 72. The threads 72 mate with matching threads on the passage 58 on the right hand side of FIG. 2, to the right of the lateral passage 60. On clockwise rotation of handle 70, the shaft 68 is advanced and moves to the left. The shaft 68 is thus forced to the left at a rate dependent on the pitch of the threads 72.

A stinger rod 74, which is an elongate rod sized to fit in the passage 22 with clearance, extends from a free end to connect to shaft 68. The stinger rod 74 passes along the passage 58 and into the passage 22 to contact the ball 24 of grease fitting 16 and thereby push the ball 24 away from its seat and defeat the grease fitting 16 checking function thus turning it into an outlet valve. This is illustrated in FIG. 2 where the stinger rod 74 is moved far to the left and the ball 24 is lifted from the seat creating a passageway.

Defeating the check valve assists in draining the cavity 12. The drain fitting 50 first attaches by threaded connection at the threads 56. After attachment, a hose or tubing is threaded to the lateral passage 60 at the threads 62. Next, the shaft 68 is rotated clockwise using the handle 70 to advance stinger rod 74 into the check valve ball 24 to defeat the check valve. The check valve is held in the defeated position shown in FIG. 2 indefinitely while pressure is applied to the cavity 12, which forces the resident grease in the cavity 12 out and open the cavity for drainage.

The drainage of cavity 12 is ordinarily accomplished while simultaneously filling the cavity 12. In the complete process, the pushing of grease into cavity 12 is represented by arrow 47 through the inlet fitting 20 and the arrow through passage 26 of the inlet valve 14. The outlet of grease from cavity 12 is represented by the arrow through passage 34 of outlet valve 16 and the arrow 49 through outlet fitting 50.

After the cavity 12 has been adequately drained, the drain (outlet) fitting 50 is removed. The typically sequence of operation is to first retract the stinger 74 to enable the ball 24 of grease fitting 16 to seat and close. Thereafter, the laterally extending hose or drain line is removed from the thread 62 by unthreading. Then, the body 52 is removed by unthreading from the threads 56.

This procedure of injecting fresh sealing grease into the plug or gate valves during fracing operations and then draining the contaminated sealant grease removes sand from the valve that can interfere with the valve sealing performance. The actual detailed procedure varies slightly depending on valve type, but it is a frequent operation, much more frequent than the normal greasing of a valve used in the process industry.

The problems encountered in the example discuss above include scratching of the outlet valve ball 24 by stinger 74 due to the frequent use of the drain tool 52. Also, once sand contaminated with grease enters the check valve assembly, it can be impossible to achieve a seal, resulting in job interruption and the need to pump a substantial amount of clean grease into grease fitting 16 in an attempt to clear the sand. In some cases, when it is very difficult or impossible to clear the sand, the greasing equipment must be fully de-pressurized to allow a new grease fitting 16 to be installed.

Figure 3B:
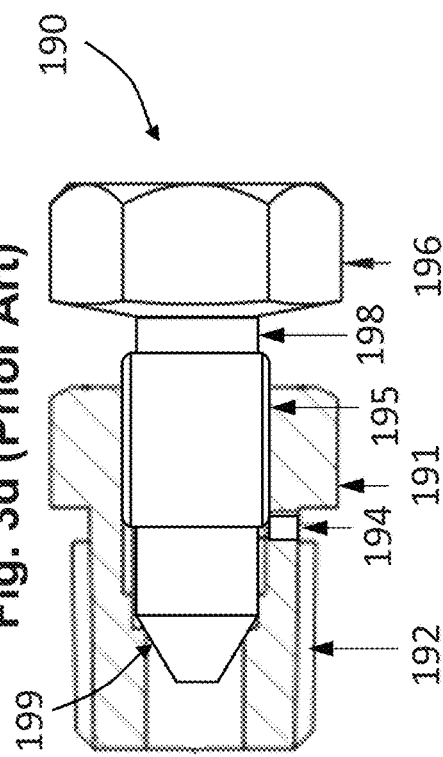
Figure 3D:
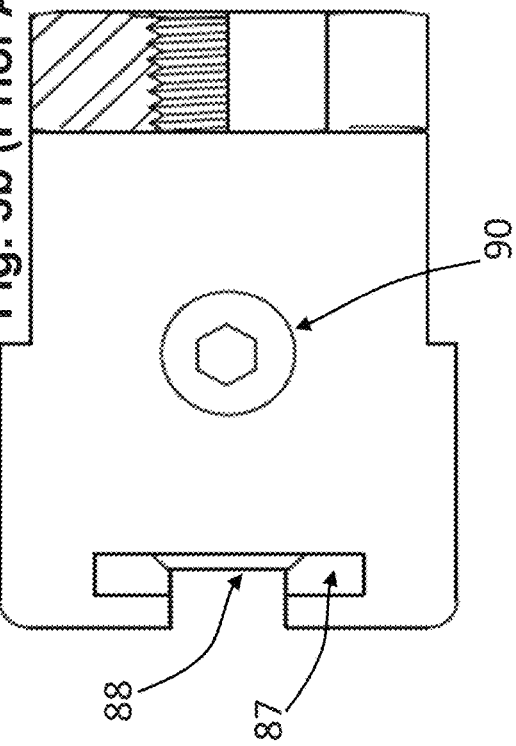
FIG. 3d is a schematic cross-sectional view of another type of commercially available bleed fitting.
Figure 3A:
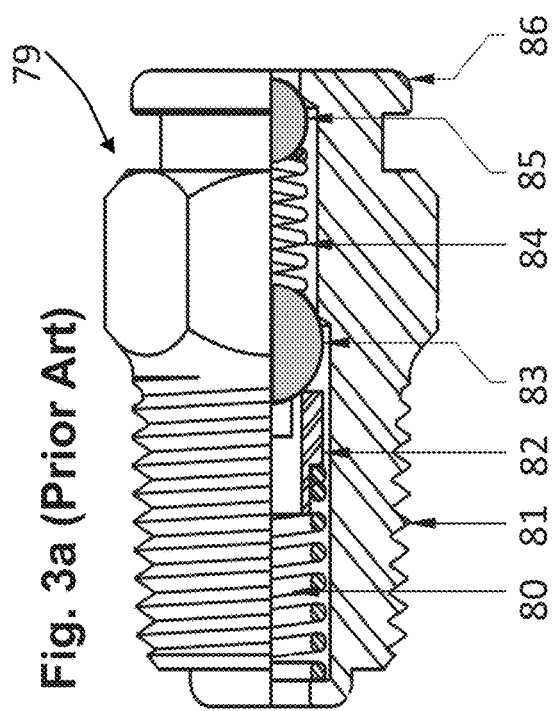
FIG. 3a is a schematic cross-sectional view of a commercially available high pressure grease fitting.

FIG. 3a is a schematic cross-sectional view of a commercially available high pressure grease fitting 79 that is now the norm for valves on high pressure fracing jobs. Grease fitting 79 has a tapered thread 81 for installation in a valve body. Grease is injected through a button head 86. Grease fitting 79 has main check valve (ball) seal 83 pushed on a seat to the right by a retainer 82 acted on by a spring 80. A secondary check valve 85 pushes on a seat to the right by a spring 84.

High pressure grease fitting 79 thus advantageously includes a double seal for improved integrity when injecting grease and when the grease pressure is removed. When the stinger bleed tool is inserted (not shown but in principle similar to the one in FIG. 2, but retained by the button head) the stinger pushes on the check valve ball 85, which in turn compresses a spring 84 and eventually unseats the main check valve ball 83. The stinger never touches the main check valve ball 83, which avoids scratching check valve ball 83. However, the double seal integrity can still be compromised, as the stinger can scratch the check valve ball 85, a condition that cannot be verified. When draining frac sand contaminated sealing grease, sand will still fall between check valve balls 83 and 85 and their corresponding seats which can lead to sealing problems or complete failure to seal of this fitting.

FIG. 3b is a schematic cross-sectional view of a commercially available adapter for the grease fitting 79 shown in FIG. 3a, which is usually made of a single piece of steel with a slot 87 that can slide over the button head 86. A compressible seal 88 affects a seal. Grease is injected through a hose attached to a thread 89. A bleed screw 90 is provided to bleed pressure and enable the disconnection process of sliding the adapter from the grease fitting button head 86 of grease fitting 79.

Figure 3C:
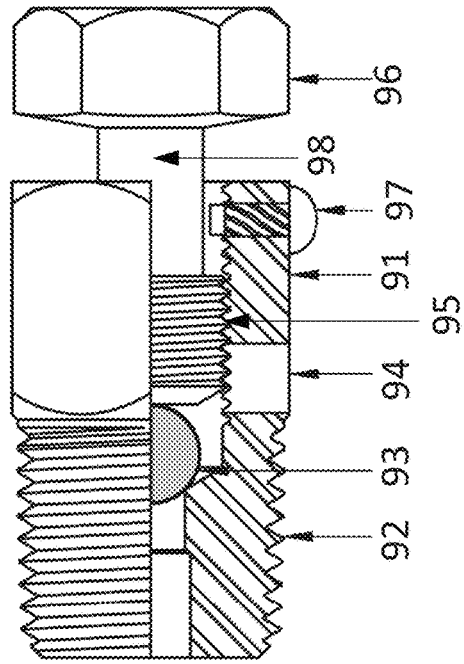
FIG. 3c is a schematic cross-sectional view of a commercially available bleed fitting.

To address the inability to reseal the grease fitting 79 of FIG. 3a, one attempted solution has been to have a dedicated bleed fitting as shown in FIG. 3c. The bleed fitting shown in FIG. 3c has a body 91 with a thread 92 for threading into a valve. An internal thread 95 allows a shaft 98 to be moved to the right by turning bolt head 96 anticlockwise, such that a ball valve 93 moves from the seat just to the left thereby allowing grease to bleed through a port 94. A shaft retainer screw 97 prevents the full travel of the shaft 98 to the right for safety and prevents the ball check valve 93 from blocking the outlet port 94. This solution, while preventing the sand contamination of the main grease injection fitting, still does not prevent the contamination of the ball check valve 93. Moreover, given that frac sand is extremely hard, attempting to crush seal by overtightening on bolt head 96 is not successful after a few operations.

FIG. 3d is a schematic cross-sectional view of another type of commercially available bleed fitting 190 that uses a tapered valve profile in an attempt to improve on the ball bleed valve depicted in FIG. 3c. Bleed fitting 190 has a body 191 with a thread 192 for threading into a valve. An internal thread 195 allows a shaft 198 to move to the right by turning bolt head 196 anticlockwise, which in turn allows a valve cone tip 199 to move from the seat just to the left allowing grease to bleed through port 194. (A shaft retainer screw is not shown.) Bleed fitting 190 suffers from the same failure mechanisms as the bleed fitting shown in FIG. 3c.

FIG. 4a is a detailed view of a newer high pressure grease fitting 100 that is widespread in current use and designed to overcome the shortcomings of the other prior art fittings. The internals of the high pressure grease fitting 100 are identical to the internals depicted in grease fitting 79 of FIG. 3a. However, the thread 102 is a parallel thread and not a tapered sealing thread as shown in fitting 79. The seal to the body of the valve is made with a conical metal seal surface 101, which engages with a similar cone profile machined into the valve body. A slot 103 is machined into the thread profile of the fitting. The parallel thread 102 and metal to metal seal profile 101 allow multiple breaking and tightening (unthreading and threading) operations of the connection of the fitting to the valve body, which is not a recommended practice for tapered threads, like those shown on fittings in FIGS. 3a and 3c, on high pressure assemblies.

FIG. 4b is schematic cross-sectional view of a common current configuration of the high pressure grease fitting 100, as used on a high pressure gate or plug valve during fracing operations. The fitting 100 is installed in a valve body 111 by threading with thread 102 and torqueing the metal seal face 101 against a similarly machined profile in the valve body 111. The grease fitting is in communication with the valve cavity 112 through a port 126. This is the normal configuration for injecting grease flowing from right to left on FIG. 4b.

FIG. 4c shows the grease fitting 100 being used for bleeding purposes. The grease fitting 100 is unscrewed a few turns by thread 102 from valve body 111, which breaks the fitting metal seal 101 from the valve body metal seal face 104. Grease is thereby allowed to flow from the pressurized body cavity 112 through passage 126 and then through slot 103 to the outside of the valve body. This process effectively allows draining of sand contaminated sealant grease from the valve cavity without risking sand entering the sensitive check valve internals of the grease fitting 100. The need for a bleed tool with a stinger and the associated risks are also eliminated.

The current practice of using grease fitting 100 has many safety and operational issues, including breaking a previously pressure tested connection, as well as breaking the connection under pressure (e.g. when the valve becomes pressure locked, wherein greasing pressure has built up in cavity preventing valve from moving). Breaking a connection under pressure is an unsound practice. In addition, there is no safety stop as depicted in FIG. 3c to prevent unthreading too many threads. Moreover, the grease flows in all directions, as the grease fitting 100 is being turned and the groove 103 is turning circumferentially. Furthermore, while using grease fitting 100 resolves problems with the internal integrity of the check valves inside fitting 100, it does not solve the secondary issue of re-establishing the seal between fitting metal seal 101 and valve metal seal 104, which will still be contaminated with sand. In the worst case, the seal face 104 in the valve is damaged by attempting to crush the hard sand while trying to affect a seal. Then even replacing the fitting 100 will not solve the leak problem as the valve sealing seat 104 has to be lapped or re-machined.

It is clear from the discussion of the prior art in FIGS. 1 to 4 that a new solution is required with the following requirements: 1) not breaking the main seal between valve body and fitting; 2) not allowing sand to enter the main grease injection fitting; 3) allowing venting of sand contaminated grease; 4) allowing flushing of passageways contaminated with sandy grease with clean grease; 5) being able to seal off the main grease port passage so that maintenance or replacement of grease or bleed fittings can take place; 6) providing a method of use that does not break previously tested pressure barriers; 7) follows accepted oil field practice and does not involve unthreading of components under pressure; and 8) is a low profile solution that does not increase the mechanical handling risk of the valve by having protrusions that can be damaged on the frequent installation and de-installation common to fracing equipment.

FIG. 5 is a schematic block cross-sectional view of a grease block assembly 200 embodying the principles of the present invention. The valve grease block assembly 200 is attached to a valve body 211, for example, with bolts (not shown) or threading with a large diameter thread. The grease block body 220 can be recessed into the valve body 211 as shown here or it can be shaped to conform to the valve body. The particular attachment and/or recessing solution will depend on the valve shape and the position of the existing or planned main grease port 226 that is in communication with the valve cavity 212.

The grease block body is preferably made out of a corrosion resistant material like stainless steel. A sealing adapter 213 provides a seal between the valve grease passage 226 and the entry bore 221 of the grease block body 220. The sealing adapter 213 has O-rings with back up rings or a metal to metal seal ferrule or other similar accepted practice (not shown). An entry bore 221 feeds into a transverse bore 222 communicating with a bleed fitting 190 through another bore 224, a main seal valve assembly 300, and a high pressure grease fitting 100 through a bore 228. Preferably, the bleed fitting 190 outlet port 194 is the same type as depicted in FIG. 3d and the grease fitting 100 is the same type as shown in FIG. 4a. The bore arrangement of the grease block 200 is shown in one plane but it can be in different planes to suit the particular application or configuration required for a low profile solution.

The main valve assembly 300 can be integral, as shown in FIG. 5 within the dashed box, or can be a cartridge valve assembly installed in the grease block body 220. In either case the general description given here will be similar.

The main valve 300 has a head 302 threaded with a thread 304 to the grease block body 220 and includes an internal hex head 306 or other suitable profile for a spanner. A retainer clip 308 prevents the backing out of the valve 300. The valve 300 has a polished shaft 310 that extends through high pressure seals 312, depending on the application, double O-rings with back-up rings or another acceptable sealing solution (detail not shown). The tapered tip 314 of the valve 300 can engage in a valve seat 316 to close off the main bore 221.

In FIG. 5, the main valve 300 is shown in the open position, which is the normal operational position, but can be closed by turning in a clockwise direction with a spanner engaged at point 306. The embodiment shown in FIG. 5 has the grease valve 100 and the bleed valve 190 as separate assemblies, but they can also be fully integrated or provided as a cartridge insert. Also different types of fittings could be used based on the preference of the end user, as the grease block assembly allows the maintenance and replacement of such fittings.

FIGS. 6a to 6d explain the advantageous method of using of the invention shown in FIG. 5. FIG. 6a shows the grease block 200 being used for greasing, where the bleed valve 190 is fully closed and the main bore isolation valve assembly 300 is open. Grease is being pumped into the grease fitting 100 as indicated by the arrow adjacent to it. This grease flows through the fitting 100 into the bore 228 as shown by the corresponding arrow, then along the transverse bore 222 and along the main bore 226 into the valve cavity 212, all indicated by arrows depicting the flow direction of grease. The grease fitting 100 is only used for its intended purpose of injecting grease and will serve no other function in this method. This ensures the integrity of this fitting and removes the prior disclosed risks of failure.

In FIG. 6b, the grease block 200 is being used to bleed trapped pressure or to remove sand contaminated grease from the valve cavity 212. Valve assembly 300 remains open. (In fact, the valve assembly 300 is never closed during normal operations of greasing or bleeding, except if a problem needs to be solved). Contaminated grease flows from valve cavity 212 into bore 226 along bore 222 into bore 224, then into bleed fitting 190 and out of its bleed port 194, all indicated by the arrows. A valve bleeding operation can thus be completed without breaking the main seal to the valve body and without misusing the grease fitting integrity in any way. In fact, bore 228 is still filled with clean grease as no flow has occurred here.

FIG. 6c, demonstrates how the grease block 200 can be flushed to stop the secondary problem of sand contaminated grease causing failure of the bleed fitting. When the bleeding operation has been completed, the bleed valve 190 is left open and grease injection is resumed through fitting 100. As the valve cavity pressure is usually higher as the grease in the cavity feeds into tight sealing areas of the valve, the fresh grease will flow freely from the grease fitting 100 into bore 228, then bore 222 and out through bore 224 and the bleed port 194 on the bleed fitting, as indicated by the arrows. In this manner clean grease is flushed through the grease fitting 190.

Advantageously, the grease fitting 190 has a taper valve seat design similar to valve assembly 300, rather than a ball valve. In order to eliminate any small remaining sand particles from causing sealing problems, the grease fitting 190 is slowly closed by turning bolt head 196 (FIG. 3d.). This closes the gap at the seat to valve tip 199 thereby accelerating the flow of grease, which will dislodge any remaining sand particles in this critical area. During this closing operation, clean grease will flow from bore 222 into bore 226 displacing any contamination from the valve seat of valve assembly 300, as shown by the small arrow in bore 226. Once the grease fitting 190 is fully closed, a few more strokes of the grease pump feeding into bore will ensure that the whole grease block 200 is filled with clean grease all the way into the exit of bore 226 into the valve cavity.

Returning to FIG. 6a, the high pressure grease fitting 100 is the least likely item to have a problem as it is never unscrewed, so the seal to the grease block 200 is never compromised. Also, as it never has a bleed tool inserted, grease fitting 100 should function reliably. The most likely problem would occur on the bleed fitting 190, which is used frequently and has a mechanical valve tip to seat function in an area 199 (FIG. 3d) than can be damaged or worn, either by use or by personnel errors during the flushing procedure. Hence, the most likely scenario is a leak through the bleed port 194 of the grease fitting 190.

In a typical prior art set-up, with the bleed fitting 190 connected to the main valve cavity 212 and a grease fitting leaking, operations would have to be interrupted and the system depressurized to allow changing out the faulty fitting. With the grease block 200, grease is simply pumped slowly into the grease fitting 100, as shown in FIG. 6a. The valve assembly 300 is closed slowly to achieve the same velocity increase across the seat to ensure absolutely no sand is present. Consequently, there is a very high chance of isolating the bore 221 (FIG. 5) successfully and thus isolating the grease block 200 and its ancillary fittings 190 and 100 from the valve cavity pressure. This is a major advantage compared to prior art and essential for fracing operations or for valves in critical positions, such as master valves on a well head.

FIG. 6d shows the valve assembly 300 fully closed and isolating the bore 221 (FIG. 5) and thus the grease bore 226 in the valve body 211. The valve assembly 300 does not have isolating seals across the bore 222, in fact it has a clearance, so it is still possible to flush fresh grease through the bleed fitting 190, as shown by the arrows. Flushing can be, for example, a last resort attempt to clear sand from fitting 190, and could also be used to clear a suspected blockage. Thereafter the bleed port 194 is left open, and the bleed fitting 190 can be safely unscrewed and replaced. In this safety position of the grease block 200 with valve 300 fully closed the grease fitting 100 can also be replaced if necessary.

Advantageously, compared to the prior art, valve grease block 200 increases safety for personnel and reduces downtime on severe service operations like fracing, frac flow backs (i.e., post-fracing flow from the wellbore) where master valve failure is an issue, and any other operation where the use of valve sealant is critical to the operation.

Figure 7:
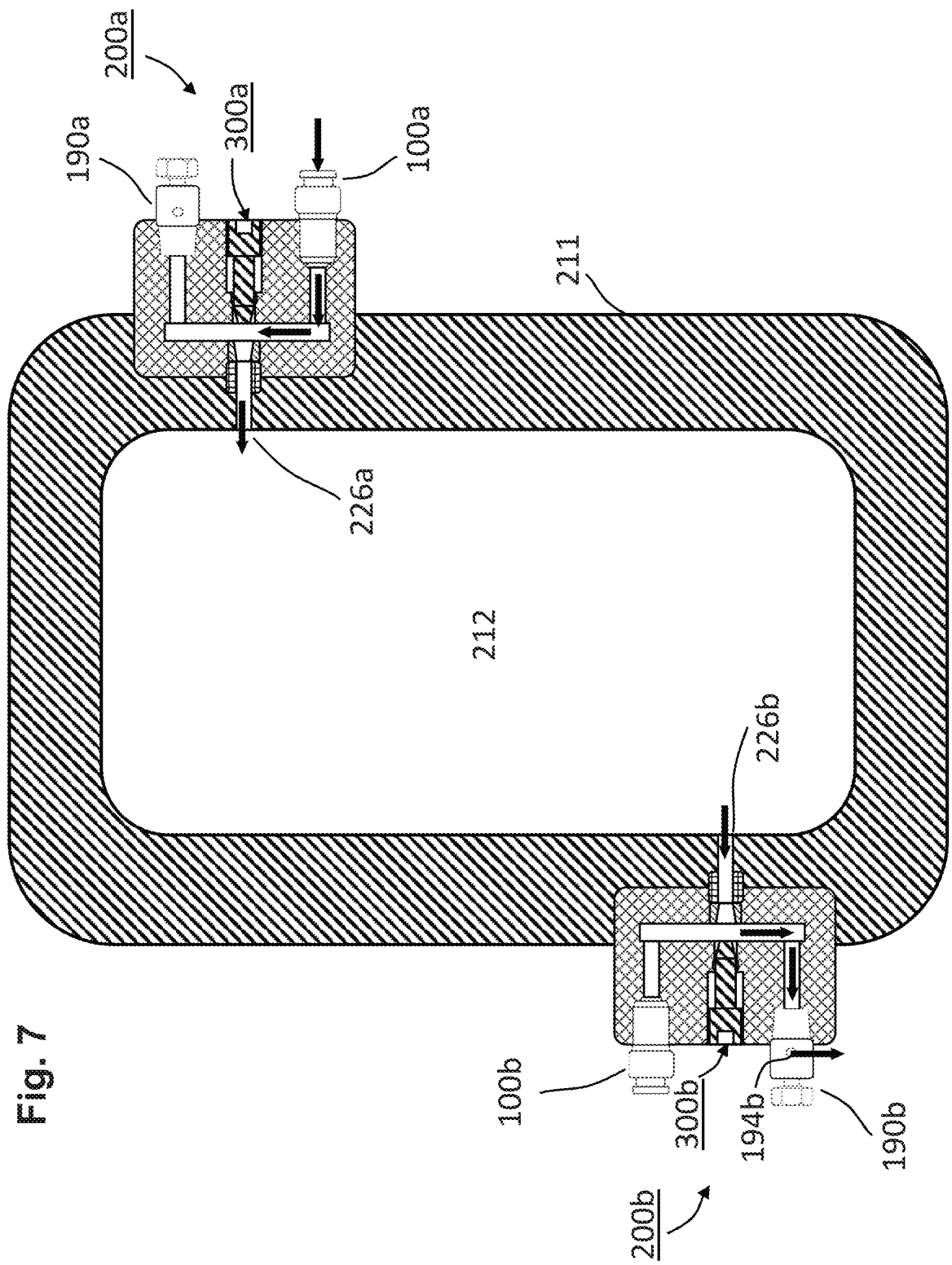
FIG. 7 is a schematic block cross-sectional view of a valve cavity with two units embodying the principles of the present invention.

FIG. 7 shows a schematic block cross-sectional view of a valve cavity with two grease blocks 200a and 200b according to the principles of the present invention. The most common operation carried out in severe service operations, such as fracing, is to inject grease in one side of a valve and into a cavity, bleed from another point while pumping grease into the cavity, and actuate the valve. The purpose of this operation is to move fresh sealant into the critical valve sealing areas and to remove grease contaminated with sand, acid or any other fluids that have been used in the operation. With fracing jobs consisting of tens of stages, this is a very frequent operation carried out for each critical valve between each fracing stage, when there is a temporary stop of high pressure pumping through the valves. (Each valve will typically have two to three such injection ports and possibly up to four.)

FIG. 7 is an example of a valve using two injection ports, although the principles of the present invention are not limited thereto and may equally be applied to valves with more than two ports. In this example, grease is injected into one port and bled at the other port. The example shows this occurring in one direction however the direction may be reversed based on the particular valve design.

FIG. 7 shows a valve body 211 with an internal cavity 212. No valve internals are shown and the representation is schematic, such that the flow path within the valve cavity 212 is not direct. For grease block assembly 200a installed in valve body 211, grease is being pumped into fitting 100a and out to valve cavity 212 through grease bore 226a, as indicated by the arrows. Bleed fitting 190a is closed and valve assembly 300a is open. This is the process explained earlier with regards to FIG. 6a: The fresh sealant grease flows through the valve internals (not shown), thereby displacing old grease, and then exits at another point close to grease port 226b. In this example, the bleed fitting 190b open, allowing bleeding of old contaminated grease through port 194b, as indicated by the arrows.

In grease block 200b, the valve assembly 300b is the usual open operational position and there is no grease being injected through 100b. This is the process explained earlier with regards to FIG. 6b. Once the turnover of sealant process is deemed satisfactory, typically when clean grease is exiting through port 194b, the grease injection adapter (not shown in FIG. 7) previously attached to grease fitting 100a is moved to grease fitting 100b and the flushing procedure as detailed in the prior with regards to FIG. 6c is carried out, eventually closing bleed fitting 190.

Thus, a complete valve sealant flushing cycle has taken place without compromising the integrity of any of the components: grease fittings 100a and 100b, and bleed fittings 190a and 190b, as well as never misusing the primary intended use of grease fittings 100a and 100b for injecting grease. Furthermore, advantageously no pressure barriers were broken or compromised with this method.

Figure 8:
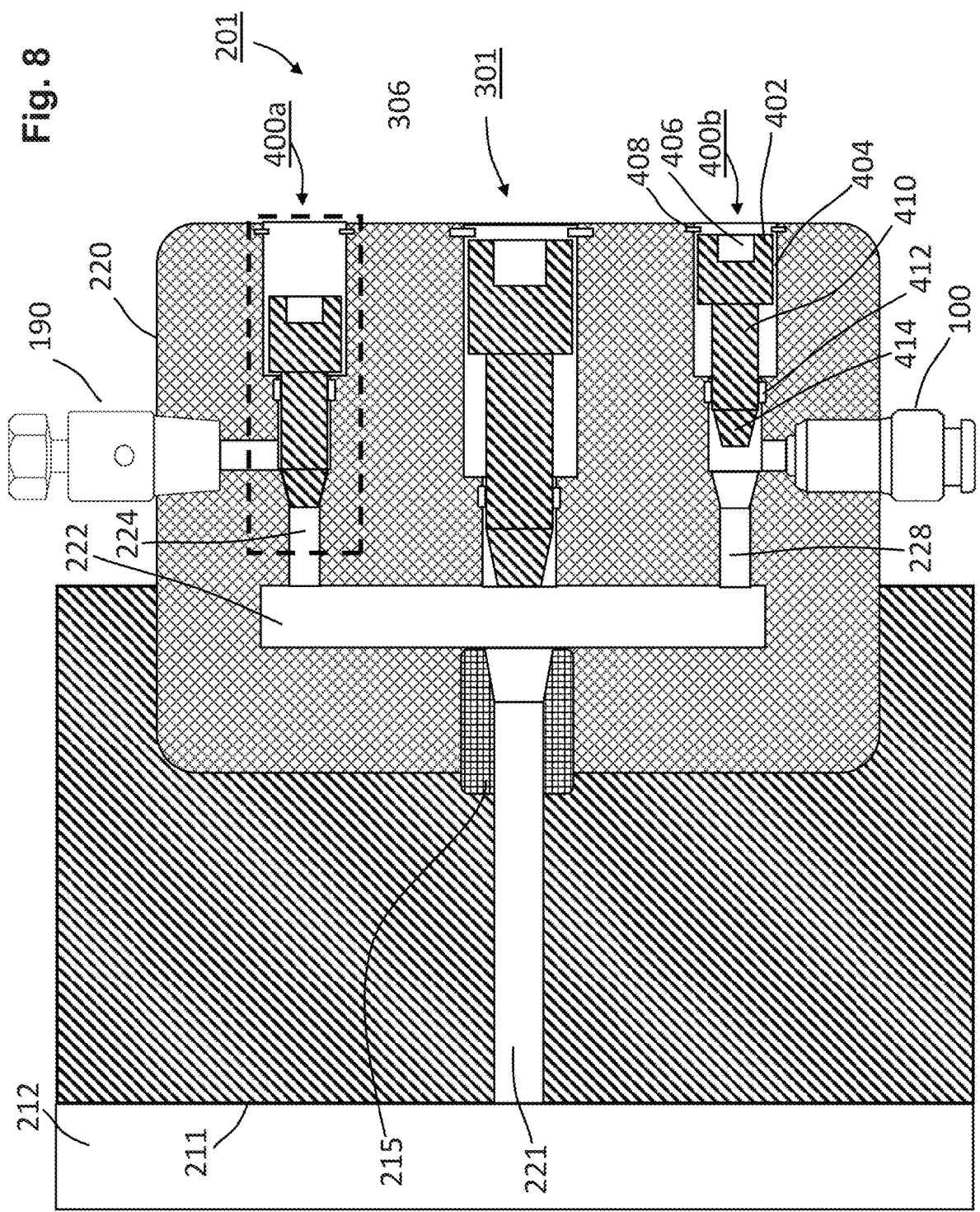
FIG. 8 is a schematic block cross-sectional and shows another embodiment of the new invention that has double sealing for hazardous fluids or master valve applications.

FIG. 8 is a schematic block cross-sectional view and shows another embodiment according to the present inventive principles, which has double sealing for hazardous fluids or master valve applications. For certain applications, such as the master valve on a wellhead, the failure of a simple grease fitting can lead to expensive repairs. A failed master valve can require killing of the well (i.e., removal of pressure), which requires setting a plug, special equipment like wireline to set plugs and then removing or repairing the valve. Particular embodiments of the present principles as disclosed in FIG. 8 provide dual barriers at all times when maintenance of grease or bleed fittings is required.

FIG. 8 shows a grease block assembly 201, with a body 220 attached to a valve body 211 that has a grease port 221 in communication with a valve cavity 212. The grease bore isolation valve assembly 301 is the same as the assembly 300 disclosed in FIG. 5, except that the sealing adapter 213 (FIG. 5) and the valve seat 316 (FIG. 5) have been replaced with a combined sealing adapter & valve seat 215, which will be detailed later with regards to FIG. 11c. The seals on this sealing adapter 215 are not shown.

Grease block assembly 201 has ports for a bleed valve 190 situated on a leg from bore 224. The new addition is the isolation valve assembly 400a, which can seal and isolate the bore 224. The valve assembly 400a is shown closed for clarity. It functions similarly to the valve assembly 300 (FIG. 5). The same type of valve assembly 400b is shown to be on the bore 228, in this case in the open position. The grease fitting 100 is on a leg from bore 228 and thus can be isolated by valve assembly 400b.

As discussed above, valve assemblies 400a and 400b consist of similar parts to valve assembly 300 (FIG. 5), with a head 402 having a recess 406 for an Allen key. The head 402 has a thread 404 engaged in the body 220, which allows the movement of the shaft 410 to engage the conical valve tip 414 with a correspondingly machined seat in the grease body 220. Thus, as shown in assembly 400a, these valves 400a and 400b can be closed, and with valve assembly 301 closed, a double barrier isolation seal is created enhancing the safety of changing out either the bleed fitting 190 or the grease fitting 100 on a critical service application that is under pressure. The schematic sketch does not show valve seats for valve assemblies 400a and 400b, but they may be designed into body 220 or a cartridge design as outline by the dashed box around assembly 400a could be used.

Figure 9A:
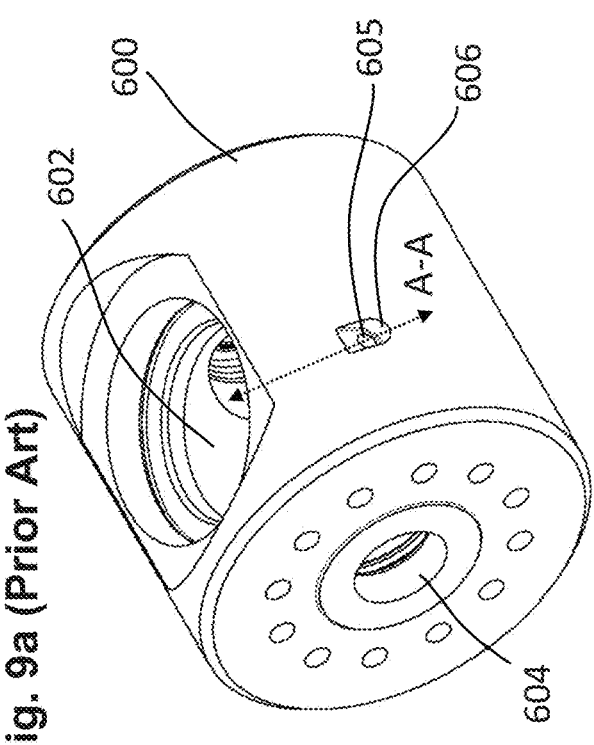
FIG. 9a is an isometric view of a currently designed plug valve with a standard grease fitting port.
Figure 9B:
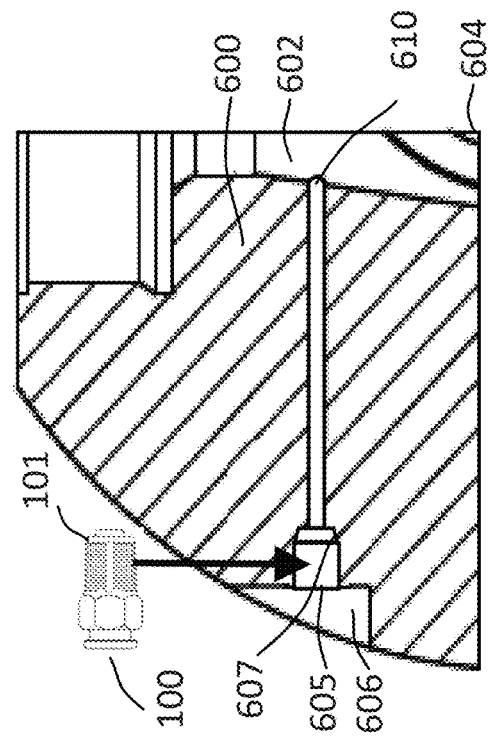

FIGS. 9a to 11e detail an example of the conversion of an existing plug valve design to an embodiment of the current invention to illustrate the practicality of the present inventive principles. In particular, FIG. 9a shows an isometric view of a high pressure plug valve body 600 with a main flow bore 604. High pressure plug valve body 600 includes a grease port 605 and recess 606 machined on the side for installing a high pressure grease fitting 100, as was detailed in conjunction with FIG. 4a. Plug valve body 600 has another such port and recess on the opposite side closer to the bottom of the valve body (not shown). FIG. 9b shows a cross-sectional A-A of the recess 606 and grease port 605 in communication with the valve cavity 602 through a grease bore 610. The grease fitting 100 is threaded into the grease port 605 and seals with a metal to metal seal between cone 101 and machined taper 607 on valve body.

Figure 10A:
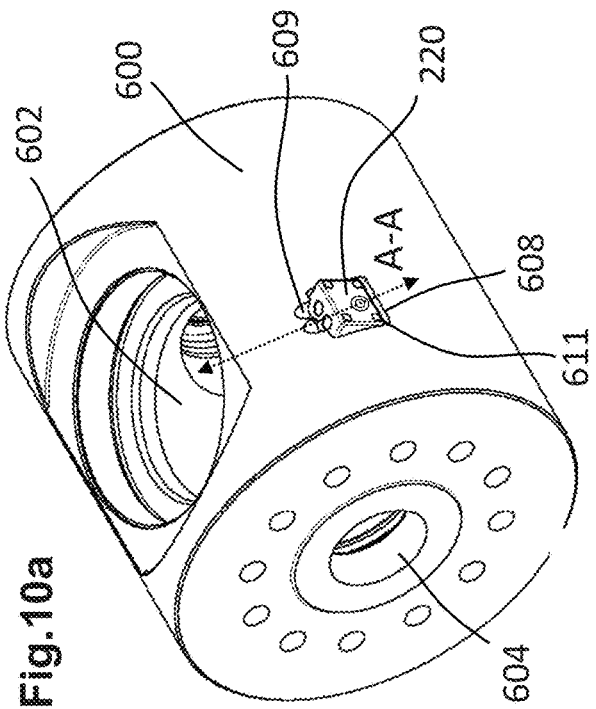
FIG. 10a is an isometric view of a plug valve embodying the principles of the present invention.

FIG. 10a shows exactly the same plug valve design, with body 600, main bore 604 and valve cavity 602. A grease block body 220 is installed (not the full assembly, block only shown without fittings) into the body by machining a larger recess. The body block 220 uses the same grease opening, but has a larger recess 608 cut into the valve body 600 which can be seen on section A-A on FIG. 10b. Block 220 is bolted in place with four bolts 611 (detailed later). Two scallops 609 are machined into the valve body 600 to give an ultra-low profile design that will be detailed in conjunction with FIGS. 11a to 11d. This demonstrates that the valve grease block 200 (once fully assembled) can be easily retrofitted to existing designs.

Figure 10B:
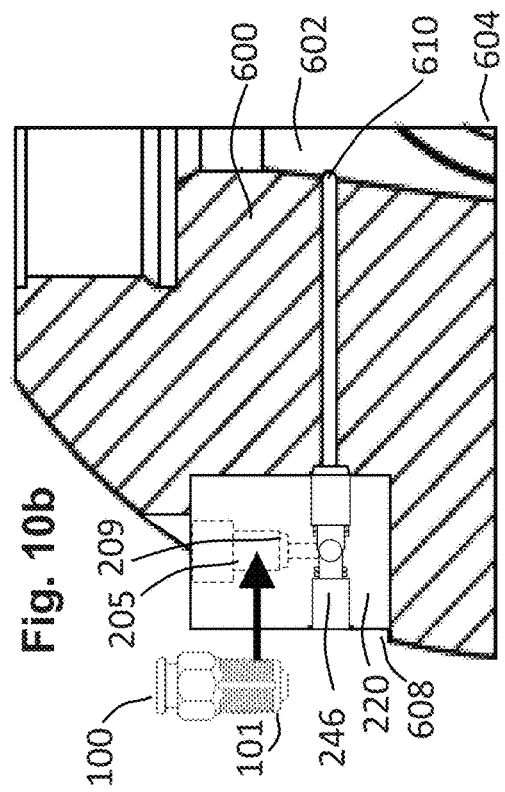
FIG. 10b is a cross-sectional view of the plug valve of FIG. 10a with respect to the plug valve cavity.

In FIG. 10b, the grease block body 220 is shown with cross-sectional A-A down the middle showing the isolation valve 301 (FIG. 8) cavity 246. Not in the same cross-section, and therefore shown in dashed lines, is the port 205 on the grease block body 220 that will receive the grease fitting 100 as indicated by the arrow. The sealing method of the grease fitting 100 is the same, with the cone 101, sealing metal to metal with a corresponding taper 209 in the grease block body. The grease block body 220 is in direct communication with the valve cavity through the same grease bore 610. It is sealed in place with a seal adapter 215 (FIG. 8), detailed below. There is another grease port on the opposite side of the valve (not shown), which is correspondingly modified to accept a second grease block assembly 200. This enables the use of the method detailed in FIG. 7, namely, injecting grease from one side near the top of the valve cavity and bleeding from another side near the bottom of the valve cavity.

In FIGS. 11a to 11e, a detailed embodiment of the invention is disclosed as a solution for the plug valve body in FIGS. 10a and 10b. (FIGS. 11a to 11e, while detailed are still schematic in nature.) This is to illustrate an actual design based on the disclosed invention for a practical application which is to retrofit an existing valve design.

FIGS. 11a and 11b are the face and plan views, respectively, of a machined grease body 220. The grease body 220 is attached to the plug valve body with four bolts (not shown), which are installed in the bores 244 and the bolt heads are accommodated flush by way of countersunk bores 242. The grease fitting (not shown) is installed in port bore 205 which is threaded. A large countersink 203 is provided, such that the fitting is only slightly exposed, just enough to be able to fit the grease adapter (FIG. 3b). The bleed fitting (not shown) can be installed in threaded bore 208, and is also countersunk in bore 207, giving the overall embodiment a very low profile.

The embodiment of FIGS. 11a and 11b is not all in one plane. In FIG. 11b, the cavity 246 is adjacent to the valve grease bore 610 (FIG. 10b) and will receive a special fitting 215, as detailed in FIG. 11c. This cavity has a bore 221 that is connected to transverse bore 222. Then the bore 228 and bore 224 for the grease and bleed fittings, respectively, are at ninety degrees to the plane of bore 222. This allows for a very compact design compared to the conceptual single plane layouts detailed in FIGS. 5 and 7 earlier.

Sections A-A, B-B and C-C are referenced to FIG. 11a. FIG. 11c shows a partial cross-sectional A-A detailing the components fitted to the cavities 246 and 248. The valve assembly 301 is the same type as was detailed in FIG. 8. Referring to the top right of FIG. 11c, from left to right, the seal adapter 215a is shown, which includes a cylindrically shaped part with a central bore and a cone shaped valve seat 317 leading to an Allen key recess 319. The seal adapter 215a has an external thread 321 and a cone shaped metal sealing face 323. The seal adapter 215a is inserted into cavity 248 and threaded with thread 321 engaging thread 249 in fully such that shaft 321 is completely to the left, as indicated by transit line a-a. Seals (not shown) are placed in two annular grooves 230.

215a illustrates the installation position, with the metal seal area 323 being mostly within the grease body 220. Then, the assembly is bolted to the valve body 600, but not torqued. Seal face 323 is now opposite the valve seal face 612, but not engaged. Next, an Allen key is inserted from port 246 into slot 319 and fitting 215a is screwed in until the metal faces 323 and 612 are fully engaged, as shown by 215b just below. The fitting is pre-torqued with the Allen key and then the 4 main bolts holding the grease body 220 to valve body 600 are torqued. The combination seal and valve seat fitting is now sealed to valve body approximately at transit line b-b.

Now the valve 306 can be installed into opening 246, with its threads engaging the threads 250 on grease block body 220. Valve 306 is threaded all the way in, and a circlip is installed in groove 245 to prevent the valve 306 from being unscrewed out of the body when in use. The smooth shaft 312 seals against seals (not shown) installed in annular grooves 232. When not in use the head of the valve 306 is all the way to the left as indicated by transit line c-c and restrained by the circlip in groove 245. To close the valve it is rotated clockwise and the cone tip 314 engages the corresponding female cone 317 on fitting 215b (installed position). The design is spaced out as per transit line d-d to ensure the valve can be fully closed.

Figure 11E:
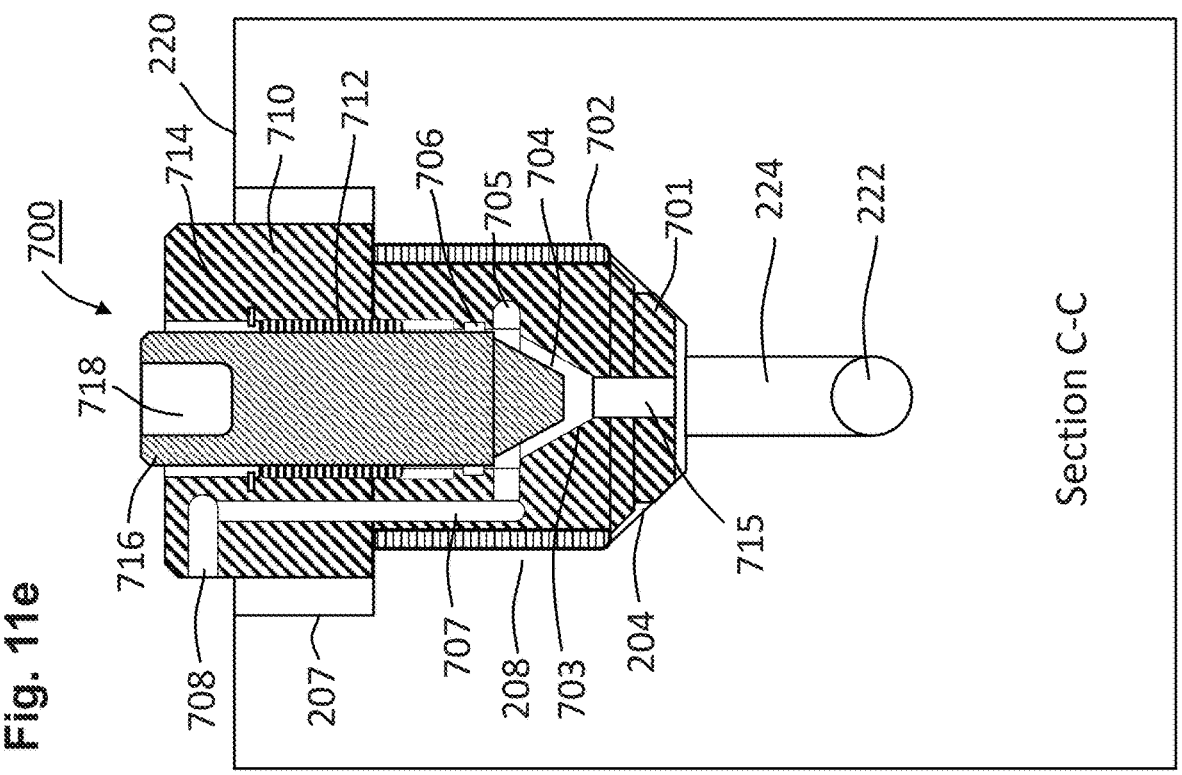
Figure 11D:
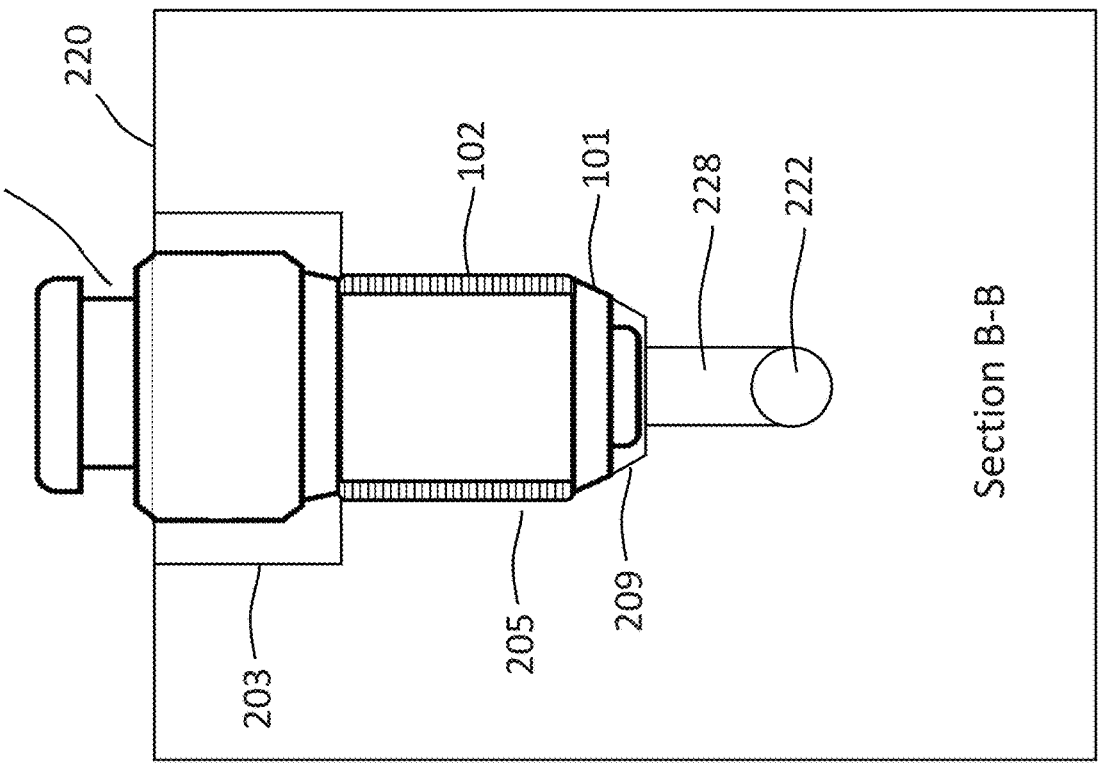

FIG. 11d shows the detail of section B-B with a grease fitting 100 installed (internals not shown). The grease fitting 100 is installed all the way into threaded port 205 with the grease fitting threads 102. The metal seal faces 101 on fitting and 209 on grease block engage to seal the bore 228 to the grease fitting 100. The grease block body 220 has a countersink 203 so that a very low profile installation is achieved.

In FIG. 11e, a preferred embodiment of a bleed valve is disclosed, which has a lower profile than commercially available bleed valves, as well as some enhancement to ensure self-cleaning grease flow. A cone valve seat design is preferred over a ball seat, as it is easier to control the velocity of the grease flow to ensure the removal of any remaining sand particles as was discussed above. The bleed fitting assembly 700 consists of an outer body 710 installed in port 208, such that the external thread 702 can engage with an internal thread in grease body 220. This configuration seals cone seal 701 metallically to the equivalent taper 204 in the grease body 220, so that the bore 715 is sealed to the bore 224 in the grease block body. The bleed fitting 700 has an internal valve 716 that can be rotated by an Allen key in slot 718 and is threaded to the bleed body 710 by a thread 712. A retainer 714 prevents the removal of the bleed valve during use and the valve shaft is sealed by seal 706. The valve is shown in the open position, which allows grease to flow from grease body main bore 222 into bleed bore 224 and into bleed fitting bore 715. The valve tip 704 and the valve cone 703 are a matched pair. Grease then flows into a circumferential groove 705 to ensure even flow across the valve face, from there through bore 707, and then out of bore 708 to atmosphere. The addition of the circumferential groove 705 prevents the valve from creating a direct preferred flow path, which would bypass grease contaminated sand in low flow pockets.

As shown in the description, a variety of variations of the embodiments of the invention have been disclosed including a practical design example. Methods of use have also been detailed. These will enable variations of the core concept to be applied within the main inventive steps by one skilled in the art.

What is claimed is:

1. A high-pressure grease block comprising:
a grease block body having a grease block cavity defined therein and adapted to cooperate with a valve body;
a first port adapted for sealing a connection to a port on the valve body such that a grease cavity defined within the valve body communicates with the grease block cavity;
a second port communicating with the grease block cavity and adapted for receiving a greasing assembly; and
a third port communicating with the grease block cavity and adapted for receiving a bleeding assembly; and
further comprising a fourth port communicating with the grease block cavity and adapted for receiving an isolation valve for controlling fluid communication through the first port; and
wherein the isolation valve is adapted to close the first port to substantially prevent fluid flow between the grease block cavity and the valve body cavity while allowing fluid flow between the greasing and bleeding assemblies through the second and third ports.

2. The high-pressure grease block of claim 1, wherein the second port is adapted to receive the greasing assembly that comprises one of:
a separate greasing assembly;
a fully integrated greasing assembly; or
a greasing assembly provided as a cartridge insert.

3. The high-pressure grease block of claim 1, wherein the third port is adapted to receive the bleeding assembly that comprises one of:
a separate bleeding assembly;
a fully integrated bleeding assembly; or
a bleeding assembly provided as a cartridge insert.

4. The high-pressure grease block of claim 1, wherein the grease block is adapted to be coupled to the valve body with a high pressure sealing connection implemented with a selected one of threading or bolting.

5. The high-pressure grease block of claim 1, wherein the fourth port is adapted to provide a seat for the isolation valve.

6. A valve assembly comprising:
a valve body having a valve body cavity defined therein;
a grease block having a grease block cavity defined therein and first, second, and third ports communicating with the grease block cavity, the first port communicating with the valve body cavity;
a greasing assembly communicating with the grease block cavity through the second port; and
a bleeding assembly communicating with the grease block cavity through the third port; and
wherein the valve assembly comprises an isolation valve communicating through a fourth port of the grease block and adapted to control flow between the grease block cavity and the valve body cavity through the first port; and
wherein the isolation valve is adapted to close the first port to substantially prevent fluid flow between the grease block cavity and the valve body cavity while allowing fluid flow between the greasing and bleeding assemblies through the second and third ports.

7. The valve assembly of claim 6, wherein the fourth port is adapted to provide a seat for the isolation valve.

8. The valve assembly of claim 6, wherein the valve body forms a portion of a gate valve.

9. The valve assembly of claim 6, wherein the valve body forms a portion of a plug valve.

10. The valve assembly of claim 6, wherein the grease block is recessed into the valve body.

11. The valve assembly of claim 6, further comprising:
another grease block having a grease block cavity defined therein and first, second, and third ports communicating with the grease block cavity, the first port communicating with the valve body cavity;
another greasing assembly communicating with the another grease block cavity through the second port of the another grease block; and
another bleeding assembly communicating with the another grease block cavity through the third port of the another grease block.

12. The valve assembly of claim 6, wherein at least one of the greasing assembly, the bleeding assembly, and the isolation valve comprises a cartridge adapted for coupling with the corresponding one of the second, third, and fourth ports.

13. A method of operating a grease block having a grease block cavity and a valve port communicating with the grease block cavity and adapted for communicating with a valve cavity of a valve through the valve port, comprising:
during a valve greasing operation, flowing grease through a greasing port on the grease block and through the grease block cavity and the valve port;
during a valve bleeding operation, flowing grease through the valve port and through the grease block cavity and a bleeding port; and
during a flushing operation, flowing grease through the greasing port and through the grease block cavity and the bleeding port; and
further comprising controlling grease flow through the valve port with an isolation valve during the flushing operation; and
wherein controlling grease flow through the valve port with an isolation valve during the flushing operation comprises closing the valve port with the isolation valve.

14. The method of claim 13, further comprising:
coupling a gate valve to the grease block; and
flowing grease through the valve port and into the valve cavity of the gate valve during the valve greasing operation.

15. The method of claim 13, further comprising:
coupling a plug valve to the grease block; and
flowing grease through the valve port and into the valve cavity of the plug valve during the valve greasing operation.

* * * * *